(12) United States Patent
Thunström

(10) Patent No.: US 11,714,487 B2
(45) Date of Patent: Aug. 1, 2023

(54) GAZE AND SMOOTH PURSUIT BASED CONTINUOUS FOVEAL ADJUSTMENT

(71) Applicant: Tobii AB, Danderyd (SE)

(72) Inventor: Robin Thunström, Danderyd (SE)

(73) Assignee: Tobii AB, Danderyd (SE)

(*) Notice: Subject to any disclaimer, the term of this patent is extended or adjusted under 35 U.S.C. 154(b) by 0 days.

(21) Appl. No.: 15/942,054

(22) Filed: Mar. 30, 2018

(65) Prior Publication Data

US 2018/0224935 A1 Aug. 9, 2018

Related U.S. Application Data

(63) Continuation-in-part of application No. 15/864,858, filed on Jan. 8, 2018, which is a continuation of
(Continued)

(51) Int. Cl.
*G06F 3/01* (2006.01)
*G09G 3/00* (2006.01)

(52) U.S. Cl.
CPC .......... *G06F 3/013* (2013.01); *G06T 2210/36* (2013.01); *G09G 3/003* (2013.01); *G09G 2310/04* (2013.01); *G09G 2340/0407* (2013.01)

(58) Field of Classification Search
CPC ..... G06F 3/013; G06T 19/20; G06T 2210/36; G09G 3/003; G09G 2310/04; G09G 2340/0407
(Continued)

(56) References Cited

U.S. PATENT DOCUMENTS 4,348,186 A 9/1982 Harvey et al.
4,836,670 A 6/1989 Hutchinson
(Continued)

FOREIGN PATENT DOCUMENTS

DE 19731301 A1 1/1999
EP 1854516 A1 11/2007
(Continued)

OTHER PUBLICATIONS

Arnow et al., "Foveated Visual Search for Corners", IEEE Transactions on Image Processing, vol. 16 Issue: 3, Mar. 2007, pp. 813-823.
(Continued)

*Primary Examiner* — Julie Anne Watko
(74) *Attorney, Agent, or Firm* — Christopher I. Moylan

(57) ABSTRACT

An eye tracking device determines a user's gaze point on a display device and a setting for a foveated region associated with a fixation position, based on a first location of the fixation position. The eye tracking device defines at least one of a size, shape, or positioning of the foveated region relative to the fixation position. The eye tracking device determines a second location of the fixation position associated with a change of user gaze and changes the foveated region setting. At least one of the shape or size of the foveated region changes based on the eye tracking device determining that a distance difference between the first and second locations is larger than a threshold. At least one of the size or the shape of the foveated region is continuously adjusted based on the fixation position being in smooth pursuit between the first location and the second location.

11 Claims, 14 Drawing Sheets

Related U.S. Application Data application No. 15/270,783, filed on Sep. 20, 2016, now Pat. No. 9,898,081, which is a continuation-in-part of application No. 14/197,171, filed on Mar. 4, 2014, now Pat. No. 9,665,171.

(60) Provisional application No. 61/772,366, filed on Mar. 4, 2013.

(58) Field of Classification Search
USPC .................................................... 345/156
See application file for complete search history.

(56) References Cited

U.S. PATENT DOCUMENTS

| | | | |
|---|---|---|---|
| 5,218,387 | A | 6/1993 | Ueno et al. |
| 5,294,427 | A | 3/1994 | Sasaki et al. |
| 5,583,795 | A | 12/1996 | Smyth |
| 5,638,176 | A | 6/1997 | Hobbs et al. |
| 6,028,608 | A | 2/2000 | Jenkins |
| 6,152,563 | A | 11/2000 | Hutchinson et al. |
| 6,182,114 | B1 | 1/2001 | Yap et al. |
| 6,204,828 | B1 | 3/2001 | Amir et al. |
| 6,252,989 | B1 | 6/2001 | Geisler et al. |
| 6,259,795 | B1 | 7/2001 | McGrath |
| 6,351,335 | B1 | 2/2002 | Perlin |
| 6,421,185 | B1 | 7/2002 | Wick et al. |
| 6,421,604 | B1 | 7/2002 | Koyanagi et al. |
| 6,608,615 | B1 | 8/2003 | Martins |
| 6,675,075 | B1 | 1/2004 | Engelsberg et al. |
| 6,798,443 | B1 | 9/2004 | Maguire, Jr. |
| 7,027,655 | B2 | 4/2006 | Keeney et al. |
| 7,561,143 | B1 | 7/2009 | Milekic |
| 7,572,008 | B2 | 8/2009 | Elvesjo et al. |
| 7,573,439 | B2 | 8/2009 | Lau et al. |
| 7,602,924 | B2 | 10/2009 | Kleen |
| 7,668,317 | B2 | 2/2010 | Yang et al. |
| 7,850,306 | B2 | 12/2010 | Uusitalo et al. |
| 8,020,993 | B1 * | 9/2011 | Fram .................. G06F 3/013 351/200 |
| 8,775,975 | B2 | 7/2014 | Karmarkar et al. |
| 9,055,157 | B2 | 6/2015 | Miyazawa et al. |
| 9,143,880 | B2 | 9/2015 | Vennström et al. |
| 9,313,481 | B2 | 4/2016 | Sylvan et al. |
| 9,423,871 | B2 | 8/2016 | Sukumar |
| 9,638,495 | B2 | 5/2017 | Stanley |
| 9,665,171 | B1 | 5/2017 | Skogo et al. |
| 9,727,991 | B2 | 8/2017 | Guenter et al. |
| 9,740,452 | B2 | 8/2017 | Vennström et al. |
| 9,898,081 | B2 | 2/2018 | Thunstrom |
| 10,055,191 | B2 | 8/2018 | Vennström et al. |
| 10,082,870 | B2 | 9/2018 | Thunstrom et al. |
| 10,353,464 | B2 | 7/2019 | Skogö et al. |
| 2003/0067476 | A1 | 4/2003 | Miller et al. |
| 2004/0207635 | A1 | 10/2004 | Miller et al. |
| 2004/0227699 | A1 | 11/2004 | Mitchell |
| 2005/0018911 | A1 | 1/2005 | Deever |
| 2005/0047624 | A1 | 3/2005 | Kleen |
| 2006/0140420 | A1 | 6/2006 | Machida et al. |
| 2006/0214926 | A1 * | 9/2006 | Kolmykov-Zotov ... G06F 3/041 345/179 |
| 2008/0111833 | A1 | 5/2008 | Thorn et al. |
| 2009/0023498 | A1 | 1/2009 | Nakayama et al. |
| 2010/0061553 | A1 | 3/2010 | Chaum |
| 2012/0044365 | A1 | 2/2012 | Shuster |
| 2012/0105310 | A1 | 5/2012 | Sverdrup et al. |
| 2012/0146891 | A1 | 6/2012 | Kalinli |
| 2012/0156652 | A1 | 6/2012 | Lane et al. |
| 2012/0163606 | A1 | 6/2012 | Eronen et al. |
| 2012/0257036 | A1 | 10/2012 | Stenberg et al. |
| 2013/0187835 | A1 | 7/2013 | Vaught |
| 2013/0201305 | A1 | 8/2013 | Sibecas et al. |
| 2013/0208926 | A1 | 8/2013 | Vincent et al. |
| 2013/0300654 | A1 * | 11/2013 | Seki ................... G06F 3/013 345/156 |
| 2013/0321265 | A1 | 12/2013 | Bychkov et al. |
| 2014/0010391 | A1 | 1/2014 | Ek et al. |
| 2014/0043227 | A1 | 2/2014 | Skogoe et al. |
| 2014/0240442 | A1 | 8/2014 | Shuster |
| 2014/0247277 | A1 | 9/2014 | Guenter et al. |
| 2014/0328505 | A1 | 11/2014 | Heinemann et al. |
| 2014/0362201 | A1 | 12/2014 | Nguyen et al. |
| 2015/0055808 | A1 | 2/2015 | Vennstrom et al. |
| 2015/0058812 | A1 | 2/2015 | Lindh et al. |
| 2015/0199559 | A1 | 7/2015 | Sztuk |
| 2015/0205126 | A1 | 7/2015 | Schowengerdt |
| 2015/0253937 | A1 | 9/2015 | Kim et al. |
| 2015/0338915 | A1 | 11/2015 | Publicover et al. |
| 2015/0362991 | A1 | 12/2015 | Koga et al. |
| 2016/0105757 | A1 | 4/2016 | Vennström et al. |
| 2016/0132289 | A1 | 5/2016 | Vennström et al. |
| 2016/0379606 | A1 * | 12/2016 | Kollin ................... G06T 3/4038 345/428 |
| 2017/0011492 | A1 | 1/2017 | Thunström et al. |
| 2017/0123492 | A1 | 5/2017 | Marggraff et al. |
| 2017/0235362 | A1 | 8/2017 | Thunstrom et al. |
| 2017/0287112 | A1 | 10/2017 | Stafford et al. |
| 2017/0287446 | A1 | 10/2017 | Young et al. |
| 2018/0129280 | A1 | 5/2018 | Skogoe et al. |

FOREIGN PATENT DOCUMENTS

| | | |
|---|---|---|
| EP | 3036620 | 6/2016 |
| EP | 3036620 B1 | 3/2017 |
| JP | 2011049988 A | 3/2011 |
| WO | 98/33315 A2 | 7/1998 |
| WO | 2008/134014 A2 | 11/2008 |
| WO | 2015/027241 A1 | 2/2015 |
| WO | 2015/133889 A1 | 9/2015 |
| WO | 2018057450 A1 | 3/2018 |

OTHER PUBLICATIONS

Guenter et al., "Foveated 3D Graphics", Microsoft Research, Retrieved from the internet: https://www.microsoft.com/en-us/research/publication/foveated-3d-graphics/, Nov. 20, 2012, 10 pages.

Nystrom et al., "Effect of Compressed Offline Foveated Video on Viewing Behavior and Subjective Quality", *ACM Transactions on Multimedia Computing, Communications and Applications*, vol. 6, issue 1, Feb. 2010, pp. 4:1-4:14.

Reingold et al., "Gaze-Contingent Multiresolutional Displays: An Integrative Review", Summer 2003-Human Factors, vol. 45, No. 2, 2003, pp. 307-327.

U.S. Appl. No. 14/197,171, Notice of Allowance dated Jan. 27, 2017, all pages.

U.S. Appl. No. 14/197,171, Final Office Action dated Jul. 28, 2016, all pages.

U.S. Appl. No. 14/197,171, Non-Final Office Action dated Dec. 24, 2015, all pages.

U.S. Appl. No. 14/467,877, Final Office Action dated Oct. 11, 2017, all pages.

U.S. Appl. No. 14/467,877, Non-Final Office Action dated Jan. 19, 2017, all pages.

U.S. Appl. No. 14/467,944, Notice of Allowance dated Apr. 17, 2015, all pages.

U.S. Appl. No. 14/467,944, Non-Final Office Action dated Oct. 20, 2014, all pages.

U.S. Appl. No. 14/859,945, Notice of Allowance dated Apr. 14, 2017, all pages.

U.S. Appl. No. 14/859,945, Non-Final Office Action dated Oct. 27, 2016, all pages.

U.S. Appl. No. 14/982,844, Notice of Allowance dated Jun. 15, 2018, all pages.

U.S. Appl. No. 14/982,844, Final Rejection dated Nov. 27, 2017, all pages.

U.S. Appl. No. 14/982,844, Non-Final Office Action dated Jun. 15, 2017, all pages.

U.S. Appl. No. 15/270,783, Notice of Allowance dated Sep. 27, 2017, all pages.

(56) References Cited

OTHER PUBLICATIONS

U.S. Appl. No. 15/270,783, Ex Parte Quayle Action dated May 11, 2017, all pages.
U.S. Appl. No. 15/270,783, Non-Final Office Action dated Jan. 5, 2017, all pages.
U.S. Appl. No. 15/476,650, Notice of Allowance dated May 21, 2018, all pages.
U.S. Appl. No. 15/476,650, Non-Final Office Action dated Jan. 5, 2018, all pages.
International Search Report and Written Opinion for PCT/US2017/051993 dated Jan. 29, 2018, all pages.
International Search Report and Written Opinion for PCT/US2014/052562 dated Nov. 18, 2014, all pages.
International Preliminary Report on Patentability for PCT/US2014/052562 dated Mar. 3, 2016, all pages.
Non-Final Office Action dated Nov. 15, 2018 in related U.S. Appl. No. 15/608,336, 22 pgs.
Loschky and Wolverton, "How Late Can You Update Gaze-Contingent Multiresolutional Displays Without Detection?", ACM Transactions on Multimedia Computing, Communications and Applications, v. 3, No. 4, (Dec. 2007). (Year: 2007).
Notice of Allowance dated Feb. 27, 2019 in related U.S. Appl. No. 16/031,457, 14 pgs.
Notice of Allowance dated Mar. 6, 2019 in U.S. Appl. No. 15/608,336, 5 pgs.
International Preliminary Report on Patentability dated Apr. 4, 2018 in related PCT application No. PCT/US2017/051993, 12 pgs.
Non-Final Office Action dated Apr. 11, 2019 in related U.S. Appl. No. 15/864,858, 20 pgs.
Non-Final Office Action dated May 14, 2019 in related U.S. Appl. No. 16/132,656, 12 pgs.
Supplemental Notice of Allowance dated Jun. 7, 2019 in related U.S. Appl. No. 16/031,457, 4 pgs.
Notice of Allowance dated Jun. 14, 2019 in related U.S. Appl. No. 14/467,877, 16 pgs.
"Nvidia Variable Rate Shading—Feature Overview", DU-09204-001-v01, Sep. 2018, 10 pages.
U.S. Appl. No. 14/197,171, "Advisory Action", dated Dec. 13, 2016, 5 pages.
U.S. Appl. No. 14/197,171, "Patent Application", 29 pages.
U.S. Appl. No. 14/467,877, "Notice of Allowance", dated Jun. 14, 2019, 9 pages.
U.S. Appl. No. 14/982,844, "Notice of Allowance", dated May 1, 2018, 7 pages.
U.S. Appl. No. 15/270,783, "Notice of Allowance", dated Dec. 8, 2017, 5 pages.
U.S. Appl. No. 16/031,457, "Supplemental Notice of Allowability", dated Jun. 7, 2019, 2 pages.
U.S. Appl. No. 16/132,656, "Non-Final Office Action", dated May 14, 2019, 9 pages.
Bhonde, "Turing Variable Rate Shading in VRWorks", Available online at :https://devblogs.nvidia.com/turing-variable-rate-shading-vrworks/, Sep. 24, 2018, 8 pages.
Loschky, et al., "The Limits of Visual Resolution in Natural Scene Viewing", Visual Cognition, vol. 12, No. 6, 2005, pp. 1057-1092.
PCT/US2017/051993, "Invitation to Pay Additional Fees and Partial Search Report", dated Nov. 30, 2017, 10 pages.

\* cited by examiner

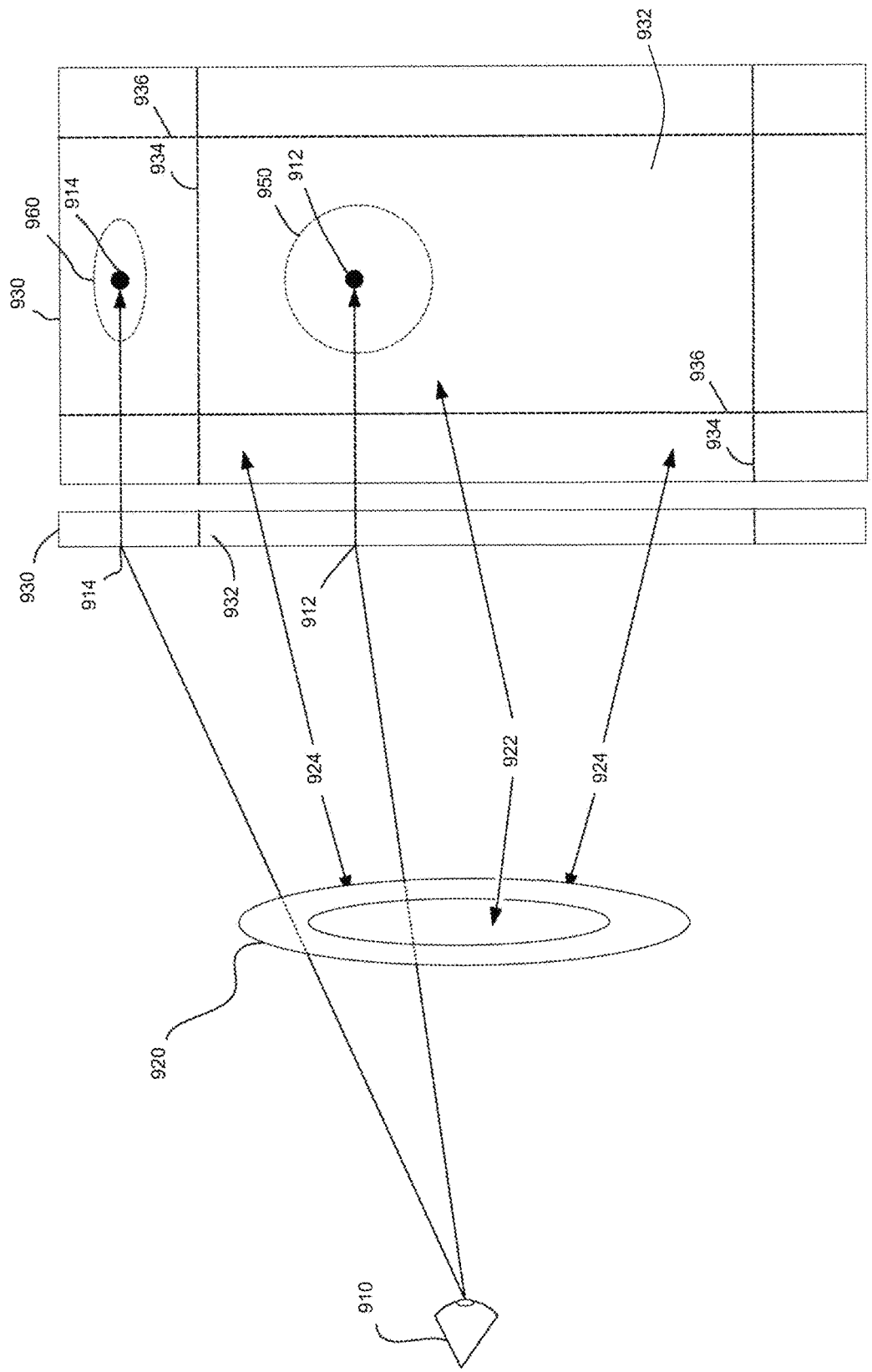

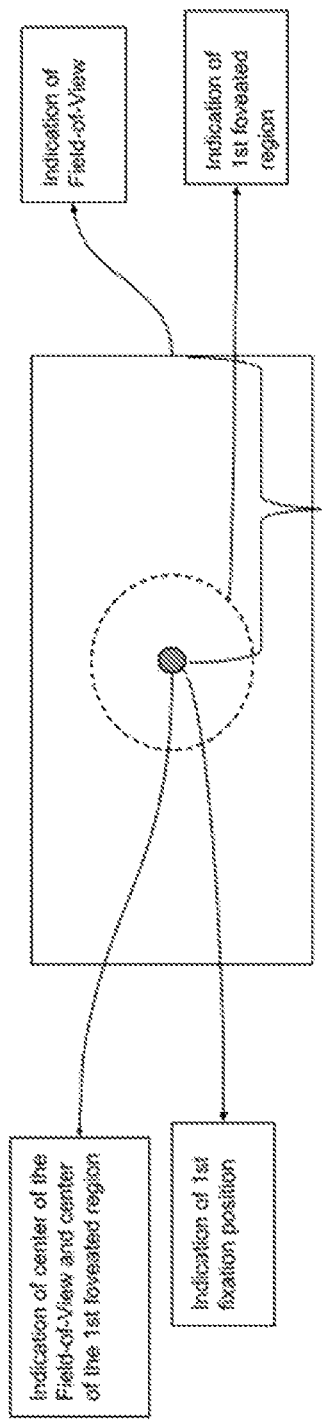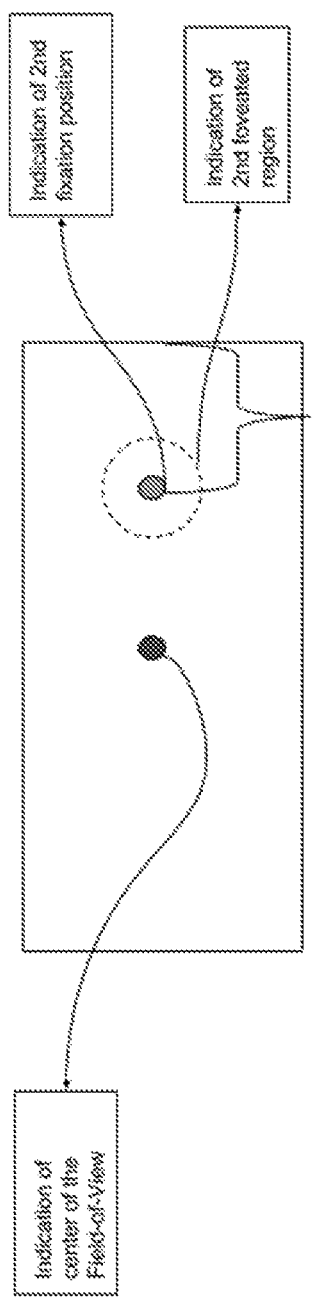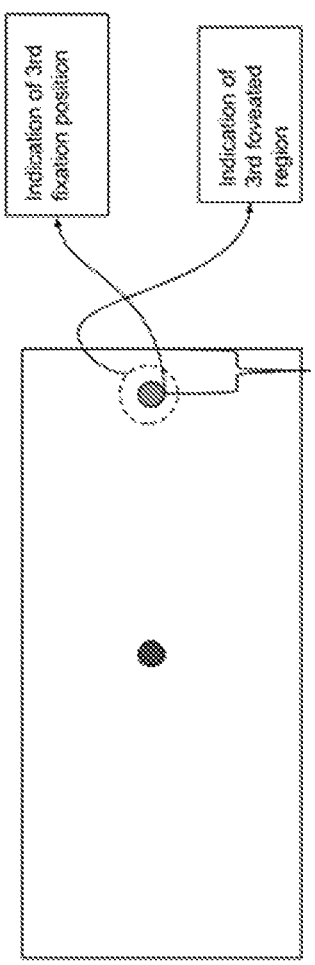

GAZE AND SMOOTH PURSUIT BASED CONTINUOUS FOVEAL ADJUSTMENT

CROSS-REFERENCE TO RELATED APPLICATIONS

This application is a continuation-in-part of U.S. patent application Ser. No. 15/864,858, filed Jan. 8, 2018, which is a continuation of U.S. patent application Ser. No. 15/270,783, filed Sep. 20, 2016, now U.S. Pat. No. 9,898,081, which is a continuation-in-part of U.S. patent application Ser. No. 14/197,171, filed Mar. 4, 2014, now U.S. Pat. No. 9,665,171, which claims priority to U.S. Provisional Patent Application No. 61/772,366, filed Mar. 4, 2013, the entire disclosures of which are hereby incorporated by reference, for all purposes, as if fully set forth herein.

BACKGROUND OF THE INVENTION

Graphical items may be used on a display to show data and information to a viewer. These graphical items may include text, images, and video. Graphical items in the area of computing are well known and have been in use for many years. Recently, showing three dimensional (3D) graphical items on a display has increased in importance in areas such as gaming, modeling and movies.

When displaying graphical items, a system such as a computer uses a processor in combination with memory to display the items on a screen or other display device. Methods for displaying graphical items vary, but typically they rely on a computer interpreting commands to control a graphics processing device that provides graphical items for display. The graphics processing device typically contains custom hardware for this purpose including a processor and memory. In some computer systems the graphics processing device is fully integrated, and in others it is provided as a separate component known as a graphics card.

Graphics processing devices have limits on their processing power, usually quantified in terms of the amount of graphical items that can be displayed on a screen at any given time. This is typically limited by the capabilities of the hardware embodying the graphics processing device, including processors, memory, and communication channels. Additionally, the amount of graphical items able to be displayed on a screen at a given point can be limited by communication limits between the graphics processing device and computer.

In many scenarios that require graphical items be displayed on a screen, a user only focuses on a portion of the screen, and therefore only a portion of the graphical items, an any given time. Meanwhile, other graphical items continue to be displayed on the remaining portions of the screen, which the user is not focused on. This wastes valuable graphics processing device resources to produce graphical items that cannot be fully appreciated by the user because the visual acuity of a human drops dramatically outside those images immediately focused on.

BRIEF DESCRIPTION OF THE INVENTION

In some embodiments, a system for presenting graphics on a display device is provided. The system may include an eye tracking device and a graphics processing device. The eye tracking device may be for determining a gaze point of a user on a display device. The graphics processing device may be for causing graphics to be displayed on the display device. The graphics displayed on the display device may be modified such that the graphics are of higher quality in an area including the gaze point of the user, than outside the area.

In another embodiment, a method for presenting graphics on a display device is provided. The method may include determining, with an eye tracking device, a gaze point of a user on a display device. The method may also include causing, with a graphics processing device, graphics to be displayed on the display device. The graphics displayed on the display device may be modified such that the graphics are of higher quality in an area including the gaze point of the user, than outside the area.

In another embodiment, a non-transitory machine readable medium having instructions thereon for presenting graphics on a display device is provided. The instructions may be executable by one or more processors to perform a method. The method may include determining a gaze point of a user on a display device, and causing graphics to be displayed on the display device. The graphics displayed on the display device may be modified such that the graphics are of higher quality in an area including the gaze point of the user, than outside the area.

In another embodiment, a system for presenting graphics on a display device is provided. The system may include an eye tracking device in a user wearable device for determining a gaze point of a user on a display device a processing device for causing graphics to be displayed on the display device; wherein the graphics displayed on the display device are modified such that the graphics are of higher quality in an area including the gaze point of the user, than outside the area.

BRIEF DESCRIPTION OF THE DRAWINGS

The present invention is described in conjunction with the appended figures:

FIGS. 9A 9B illustrate an example of components of a VR headset, according to an embodiment.

FIGS. 11A-11C is another illustration of continuous adjustable foveated region based on the relative distance between the fixation position and the edge of the display image, according to an embodiment;

Figure 1:
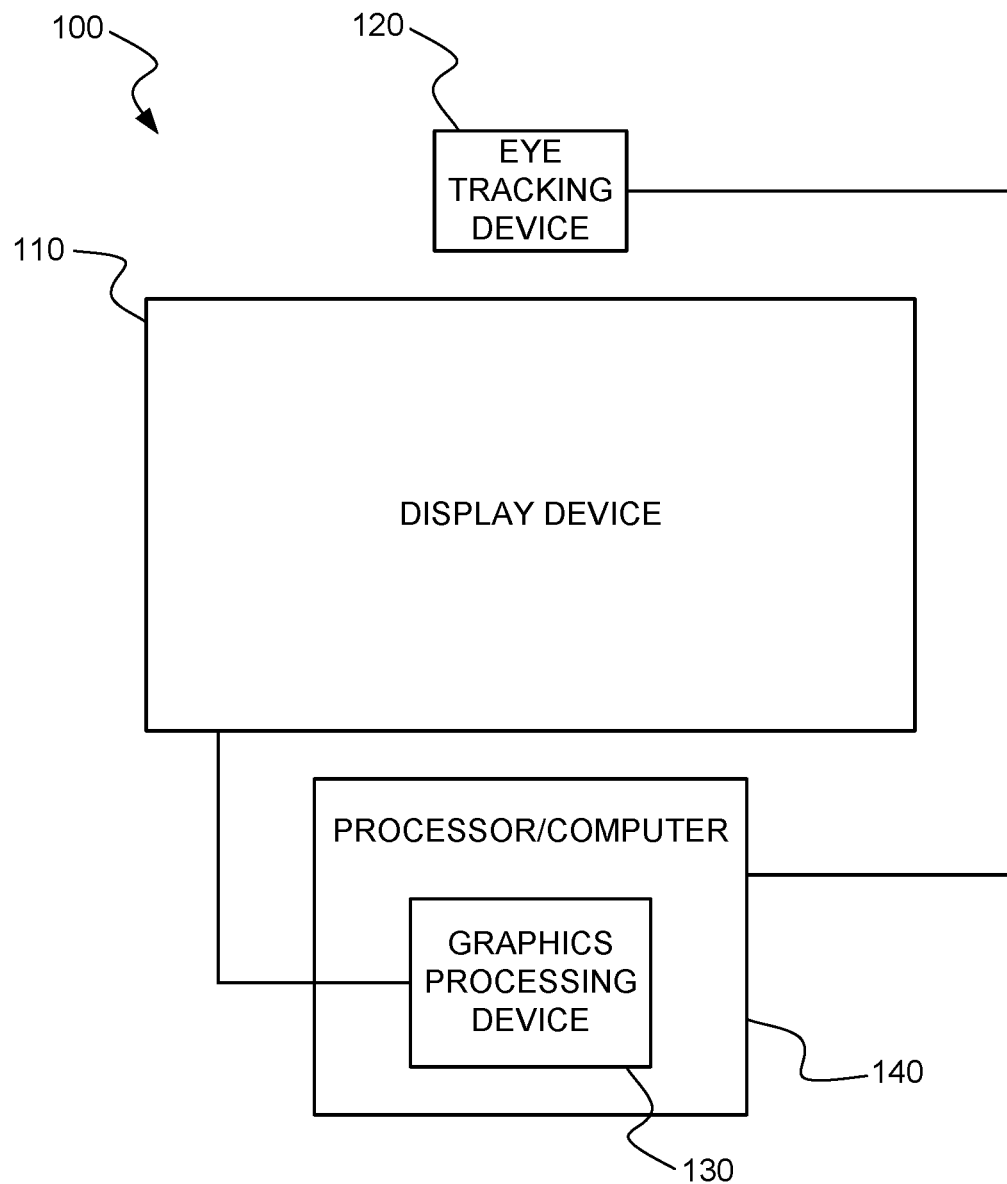
FIG. 1 is a block diagram of one possible system of the invention for modifying an image based on a user's gaze point.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements in the invention may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function. Any detail present in one discussed embodiment may or may not be present in other versions of that embodiment or other embodiments discussed herein.

The term "machine-readable medium" includes, but is not limited to, portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments of the invention may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

In some embodiments of the invention, and with reference to FIG. 1, a system 100 for presenting graphics on a display device 110 is provided. System 100 may include an eye tracking device 120 and a graphics processing device 130. In some embodiments, the system may also include a processor/computer 140 which communicates with, and controls, graphics processing device 130. In some embodiments, any function of graphics processing device 130 may be performed, in whole or in part, by processor/computer 140. Merely by way of example, eye tracking device 120 may be provided integral to, or in addition to, a personal computer 140 having graphics processing device 130 and a central processing unit (in some configurations, graphics processing device 130 and the central processing unit are integrated). In other embodiments, eye tracking device 120 may be provided integral to, or in addition to, a gaming console 140 or other device having graphics processing device 130 and a central processing unit. Examples of gaming consoles include those produced and available from Microsoft™, Nintendo™, or Sony™. In other embodiments, the eye tracking device 120 may be provided integral to, or in addition to, a wearable headset such as a Virtual Reality (VR) or Augmented Reality (AR) or the like. Examples of wearable headsets include those produced and available under the names Oculus Rift™, HTC Vive™, Sony PlaystationVR™ and Fove™. Thus, embodiments of the invention may be applied to the presentation of graphics in any number of possible devices and applications, including video display, video games, video production and editing, video communications, computer aided drafting and design, etc.

Eye tracking device 120 may be for determining at least one of a gaze point of a user on display device 110, or a change in the gaze point of the user on display device 110. Eye tracking devices and methods, sometimes referred to as gaze detection systems and methods, include, for example, products produced and available from Tobii Technology AB, and which operate by using infrared illumination and an image sensor to detect reflection from the eye of a user. An example of such a gaze detection system is described in U.S. Pat. No. 7,572,008, which is hereby incorporated by reference, for all purposes, as if fully set forth herein. Other alternative gaze detection systems may also be employed by the invention, regardless of the technology behind the gaze detection system. Eye tracking device 120 may employ its own processor or the processor of another device (i.e., processor/computer 140) to interpret and process data received. When an eye tracking device is referred to herein, both possible methods of processing data are referred to.

Graphics processing device 130 employed by various embodiments of the invention may be for causing an image to be displayed on display device 110. Graphics processing device 130 may modify what image is displayed on display device 110 based at least in part on the gaze point of the user on display device 110, or a change in the gaze point of the user on display device 110, as determined by eye tracking device 120. While in some embodiments a separate non-included or non-integrated display device will be controlled by the graphics processing device 130, other embodiments may include or integrate display device 110.

Figure 2:
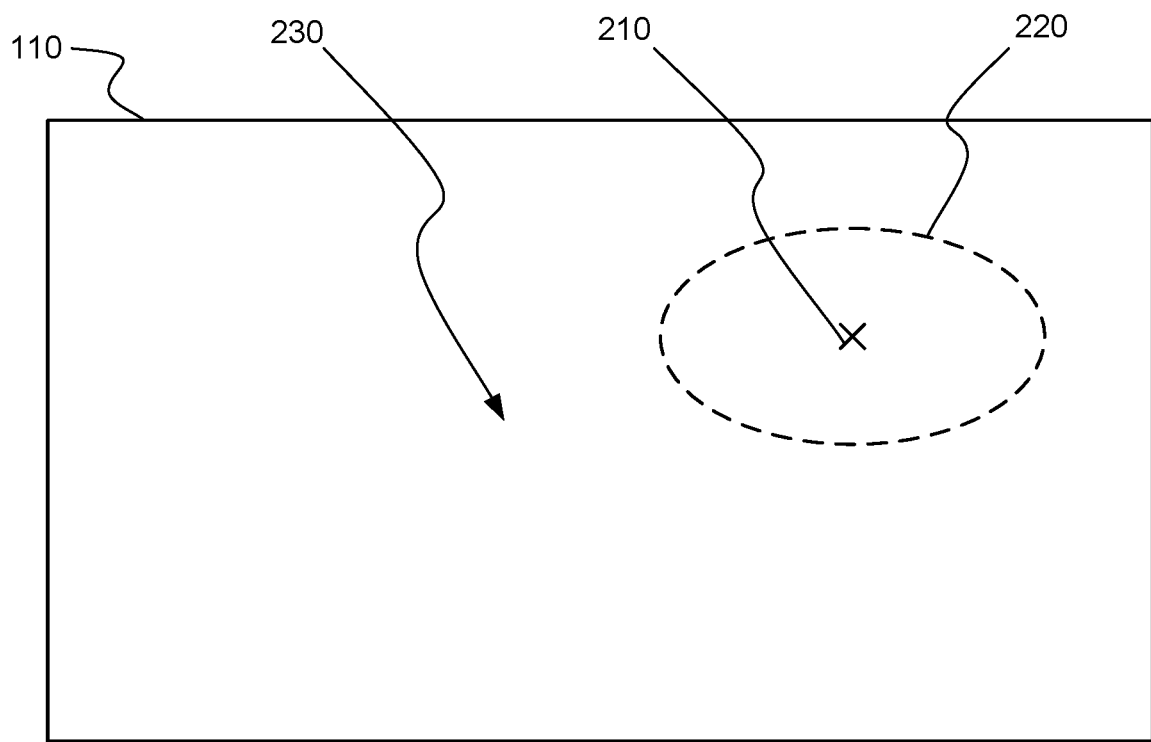
FIG. 2 is a view of a display device of the invention in which image modification is occurring in response to a user's gaze point.

The way in which the image displayed on display device 110 may be modified by graphics processing device 130 may vary depending on the embodiment, but regardless, the way in which the image is displayed may be intended to increase the image quality of portions of the image on which a user's gaze, or focused gaze, is directed, relative to those portions of the image to which the user's gaze, or focused gaze, is not directed. In this manner, the use of available resources of graphics processing device 130, and/or other system resources, are maximized to deliver image quality where it matters most on display device 110. To demonstrate, FIG. 2 illustrates a display device 110 showing a user's gaze point 210 and an area 220 around user's gaze point 210 in which embodiments of the invention may increase the quality of the image relative to the remaining area 230 of the display device 110. Thus, in various embodiments of the invention, the quality of the image produced across display device 110 may be increased in area 220 relative to remaining area 230.

When "modification" of an image presented on display device 110 is discussed herein, it shall be understood that what is intended is that a subsequent image displayed on display device 110, is different than a prior image displayed on display device 110. Thus, graphics processing device 130 and display device 110, or other device(s) discussed herein, "modify" an image by causing a first image to be displayed and then a second image to be displayed which is different than the first image. Any other change of an image discussed herein, for example, increasing or decreasing of image quality, shall also be understood to mean that a subsequent image is different than a prior image. Note that a change or modification of an image may include changing or modifying only a portion of the image. Thus, some portions of a prior image may be the same as a subsequent image, while other portions may be different. In other situations, the entirety of a prior image may be different than a subsequent image. It shall be understood that the modification of an area or an entirety of an image does not necessarily mean every finite portion of the area or entirety are changed (for example, each pixel), but rather that the area or entirety may be changed in some potentially consistent, predefined, or ordered manner (for example, the quality of the image is changed).

Increasing the quality of the image may include increasing the quality of any one or more of the below non-exclusive list of graphical characteristics, in addition to other possible characteristics known in the art:

Resolution: The number of distinct pixels that may be displayed in one or more dimensions. For example, "1024×768" means 1024 pixels displayed in height and 768 pixels displayed in width.

Shading: Variation of the color and brightness of graphical objects dependent on the artificial lighting projected by light sources emulated by graphics processing device 130.

Texture-mapping: The mapping of graphical images or "textures" onto graphical objects to provide the objects with a particular look. The resolution of the textures influence the quality of the graphical object to which they are applied.

Bump-mapping: Simulation of small-scale bumps and rough gradients on surfaces of graphical objects.

Fogging/participating medium: The dimming of light when passing through non-clear atmosphere or air.

Shadows: Emulation of obstruction of light.

Soft shadows: Variance in shadowing and darkness caused by partially obscured light sources.

Reflection: Representations of mirror-like or high gloss reflective surfaces.

Transparency/opacity (optical or graphic): Sharp transmission of light through solid objects.

Translucency: Highly scattered transmission of light through solid objects.

Refraction: Bending of light associated with transparency.

Diffraction: Bending, spreading and interference of light passing by an object or aperture that disrupts the light ray.

Indirect illumination: Surfaces illuminated by light reflected off other surfaces, rather than directly from a light source (also known as global illumination).

Caustics (a form of indirect illumination): Reflection of light off a shiny object, or focusing of light through a transparent object, to produce bright highlights on another object.

Anti-aliasing: The process of blending the edge of a displayed object to reduce the appearance of sharpness or jagged lines. Typically an algorithm is used that samples colors around the edge of the displayed object in to blend the edge to its surroundings.

Frame rate: For an animated image, the number of individual frames presented during a certain period of time to render movement within the image.

3D: Visual and temporal characteristics of an image which cause the image to appear to be three dimensional to a viewer.

Animation quality: When an animated image is presented, the detail of the animated image is decreased in the periphery of view.

Post processing effects quality

Refraction quality

Figure 3A:
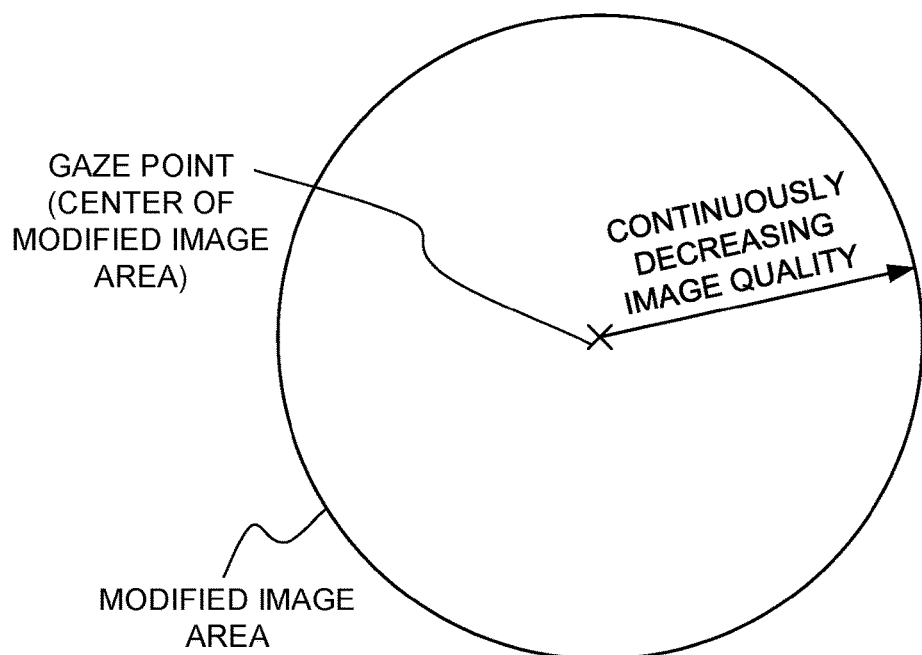
FIG. 3A is a diagram of how image quality may continuously vary within a modified image area.
Figure 3B:
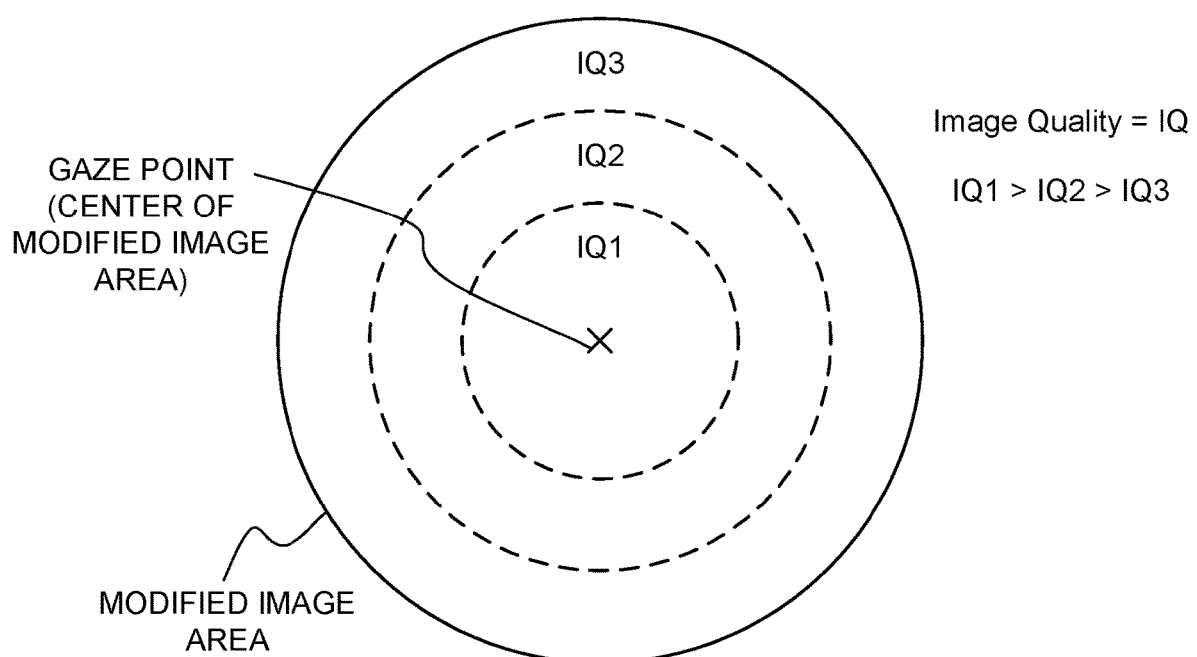
FIG. 3B is a diagram of how image quality may vary in steps within a modified image area.

Three dimensional object quality: Polygons shown based on the distance of the object to the virtual camera The size and shape of the area of the image which may be modified to appear in greater quality can vary depending on the embodiment. Merely by way of example, the shape of the area may be circular, oval, square, rectangular, or polygonal. In some embodiments, the quality of the image within the area may be uniformly increased. In other embodiments, the increase in quality of the image may be greatest at the center of the area (i.e., proximate to the gaze point), and decrease towards the edges of the area (i.e., distal to the gaze point), perhaps to match the quality of the image surrounding the area. To demonstrate, FIG. 3A shows how image quality may decrease in a linear or non-liner continuous manner from the center of a gaze area outward, while FIG. 3B shows how image quality may decrease in a stepped manner from the center of a gaze area outward.

In some embodiments, modifying the image displayed on display device 110 may occur in response to the detection of a change in the gaze point. This may occur in a number of fashions, some of which are described below.

In some embodiments, an entirety of the image may be modified during the period of change in the gaze point of the user, and once the change in the gaze point of the user ceases, either the area around end gaze point of the user or a remainder of the image (portions of the image not around the end gaze point) may be modified. Merely by way of example, in one embodiment, the quality of the entire image may be increased during movement of the user's gaze (sometimes referred to as a saccade), but the increase in quality may only be sustained in an area around the user's end gaze point once the saccade is complete (i.e., the quality of the remainder of the image may be decreased upon completion of the saccade). In a different embodiment, the quality of the entire image may be decreased during a saccade, but the decrease in quality may only be sustained areas besides around the user's end gaze point once the saccade is complete (i.e., the quality of the area of the image around the user's end gaze point may be increased upon completion of the saccade).

Additionally, the use of other system resources, including for example processor/computer 140 and related resources, may also be modified during a user's saccade. For example, non-graphical operations may be supplemented by the resources of processor/computer 140 and graphics processing device 130, during a saccade. More specifically, during a saccade, non-graphical calculations necessary for other system operations may proceed at greater speed or efficiency because additional resources associated with processor/computer 140 and graphics processing device 130 are made available for such operations.

In some embodiments, modifying the image displayed on display device 110 may include modifying a portion of the image in an area around an anticipated gaze point of the user, potentially by increasing the quality thereof. The anticipated gaze point may be determined based on the change in the gaze point of the user. To determine the anticipated gaze point of a user, eye tracking device 120 and/or another processor (i.e., the computer or game consoler's processor), may determine a rate of the change in the gaze point of the user on display device 110, and determine the anticipated gaze point based at least in part on this rate of the change.

The rate of change of the gaze point of the user, also referred to as the velocity or speed of a saccade by the user is directly dependent on the total change in the gaze point of the user (often referred to as the amplitude of the saccade). Thus, as the intended amplitude of a user's saccade increases, so does the speed of the saccade. While the saccade of a human user can be as fast as 900°/second in humans, for saccades of less than or about 60°, the velocity of a saccade is generally linearly and directly dependent on the amplitude of the saccade. For example, a 10° amplitude is associated with a velocity of 300°/second and a 30° amplitude is associated with a velocity of 500°/second. For saccades of greater than 60°, the peak velocity starts to plateau toward the maximum velocity attainable by the eye (900°/second). In response to an unexpected stimulus, a saccade normally takes about 200 milliseconds (ms) to be initiated and then lasts from about 20 to about 200 ms. Based on these relationships between saccade speed and amplitude, embodiments of the invention may determine anticipated gaze points based on saccade velocity. Other predetermined models of mathematical relationships between saccade speed and amplitude may also be employed by various embodiments of the invention to determine an anticipated gaze point.

In some embodiments, the portion of the image modified around the anticipated gaze point may also include the portion of the image around the original gaze point (i.e., the gaze point from which the user's saccade started). While the shape of the portion of the image modified may be any of those shapes described above, in some embodiments it may be a triangle or a trapezoidal shape having a progressively greater width perpendicular to a direction of the saccade as shown in FIG. 4.

Figure 4:
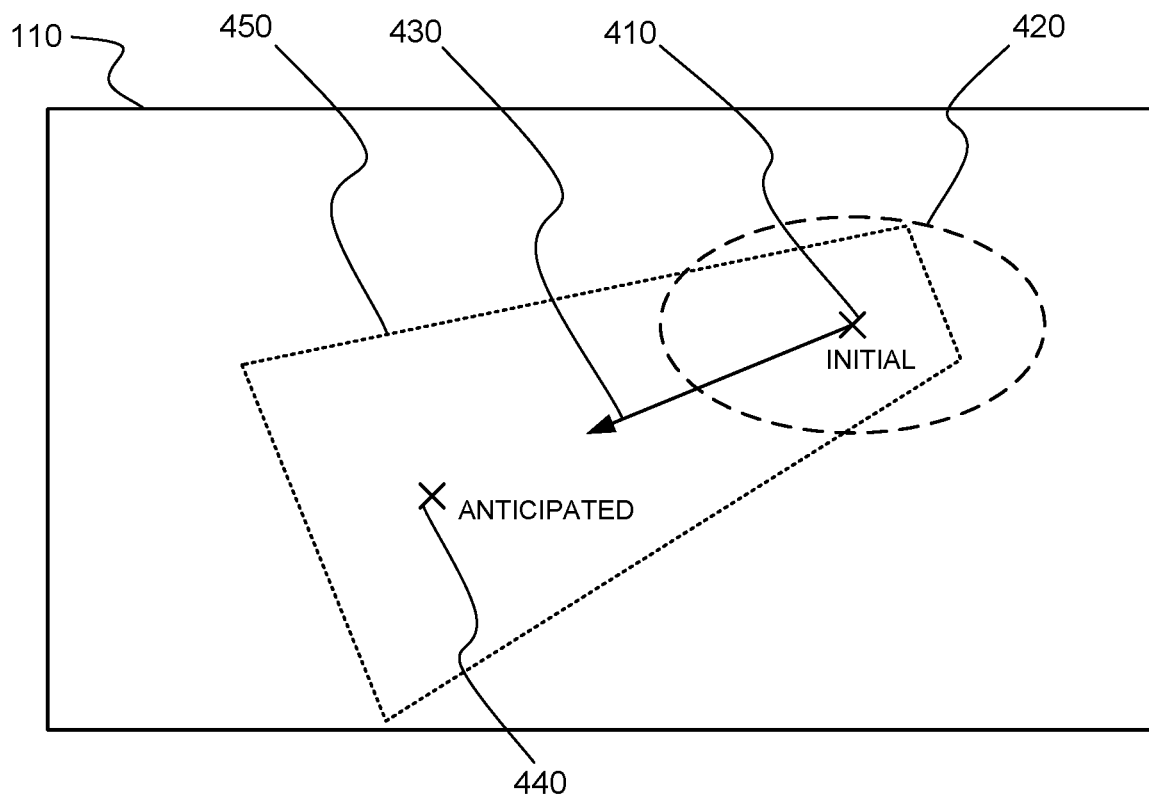
FIG. 4 is a view of a display device of the invention in which image modification is occurring in response to a detected change in a user's gaze point.

In FIG. 4, display device 110 is shown, and an initial user gaze point 410 is shown thereon. Prior to any change in initial gaze point 410, embodiments of the invention may provide increased graphics quality in area 420. When a user saccade, represented by arrow 430, is detected by eye tracking device 120, the size and shape of area 420 may change to accommodate both initial gaze point 410 and anticipated gaze point 440. The changed area 450, while being triangular and/or trapezoidal in this embodiment, may be shaped and sized differently in other embodiments. Merely by way of example, an entire side of display device 110 from the initial gaze point to the edges of the display in the direction of the saccade may also be included in changed area 450 to account for more possibilities of where the user's gaze point may end. In other embodiments, a circular, oval, or square changed area 450 may be provided. In yet other embodiments, changed area 450 may include separate and distinct areas around the initial gaze point 410 and anticipated gaze point 440.

In some embodiments, the size or shape of the area around the gaze point for which an image is modified (or which remains unmodified from a heightened quality in various embodiments), is dynamic. This may occur based at least in part on any number of factors, including the current location of the gaze point relative to the image or display device. Merely by way of example, if a user moves their gaze point to a certain portion of the screen, a predefined portion of the screen may be modified via increased quality therein (for example, a corner portion of the display having a map of a virtual area in a video game). In some embodiments, if enough user saccades having one or more predefined characteristics are detected in predefined amount of time, the entirety of the display may be modified to be rendered in greater quality.

The performance of a computing system may be directly influenced by the consumption of resources the system has at its disposal. These resources include, but are not limited to, processing power, memory size, memory access speed, and computer bus speed. The display of information such as images and other graphical items may directly require the use of such resources. The higher the quality of this information, as has been previously described, the greater the amount of resources required, or the greater level of strain on existing resources. The present invention seeks to decrease the consumption of these resources by allocating graphical processing and execution resources first and primarily to areas of display device 110 that can be readily perceived in high definition by a user, as the areas in which high definition information is actually displayed. Other areas of the display device, which will not be, or cannot easily be, perceived in high definition by a user may be allocated a lesser or remaining amount of resources. Due to latency between the output of information to display device 110 and the speed at which a user can move their eyes and perceive information, it may be desirable to provide a system in which the user does not perceive that there is any change to the quality or definition of information being displayed on the display device 110.

Figure 7A:
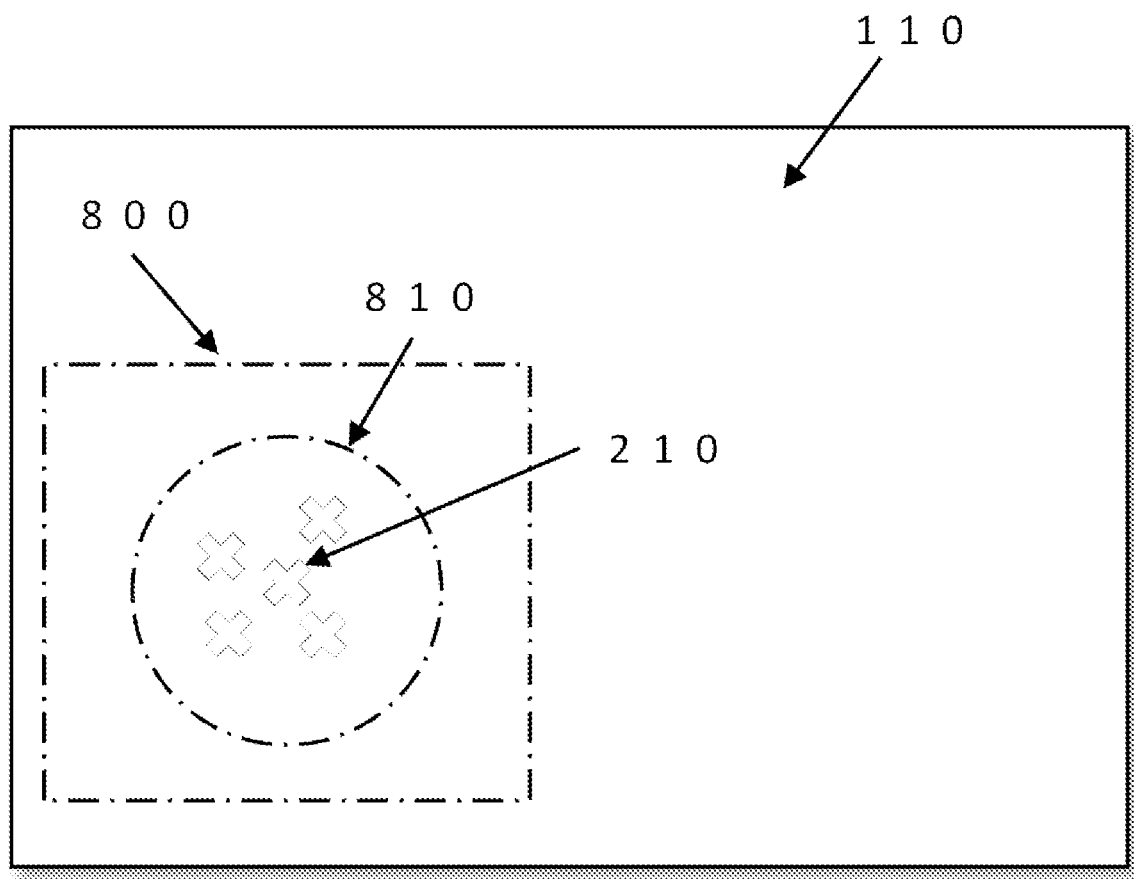
FIGS. 7A and 7B are diagrams showing a change in the location of an area on a display device according to the change in a user's gaze point.
Figure 7B:
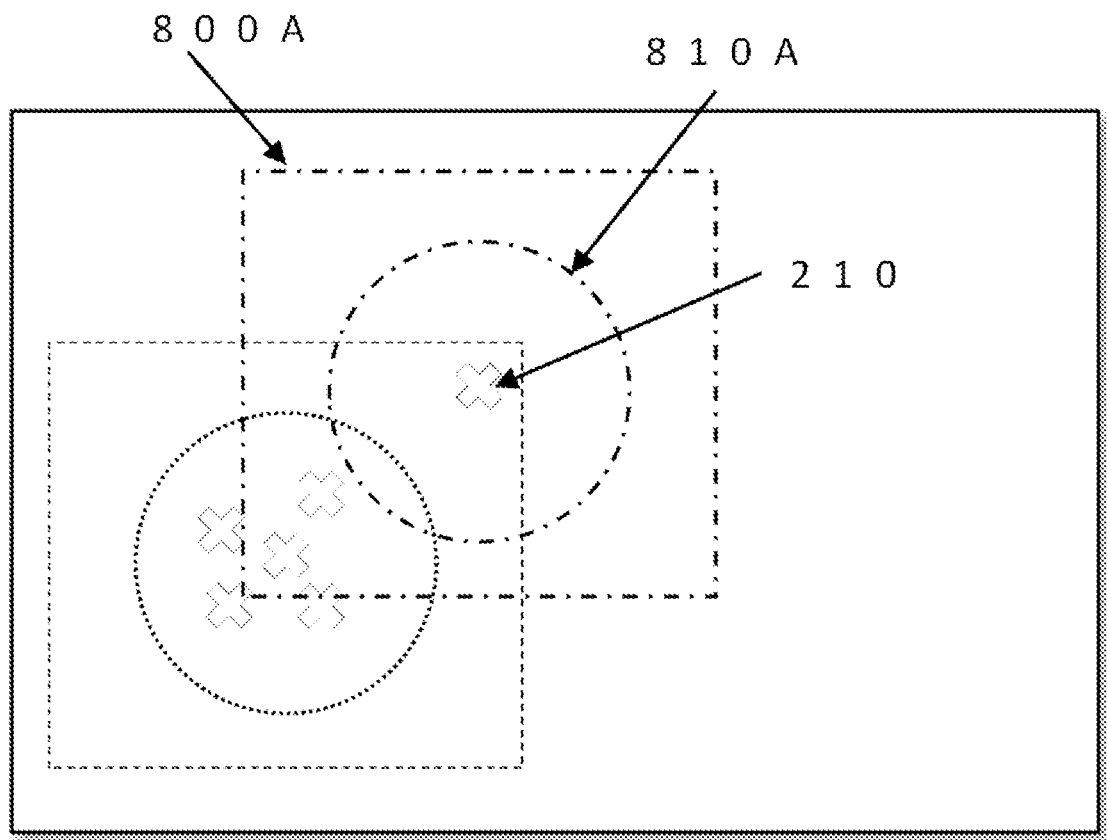

In some embodiments, the gaze point information may be determined by, or based on information from, eye tracking device 120, and may be filtered to minimize the change in areas around the gaze point for which an image may be modified. Referring to FIG. 7A the embodiment includes display device 110 comprising an area 800 containing a sub-area 810. An objective of this and other embodiments may be to maintain high definition and/or other improved graphical rendering qualities in sub-area 810 and/or area 800 around any determined gaze points 210. An image may thus be modified in area 800 such that it contains greater quality graphics or other modified parameters as previously described. If it is determined that a gaze point 210 remains within sub-area 810, the quality of the graphics or the like in area 800 may be modified such that the graphical quality of the images in area 800 are displayed at a higher quality or the like than images outside of area 800 on display device 110. If it is determined that the gaze point is located outside of sub-area 810, as shown in FIG. 7B, a new area 800A is defined containing a new sub-area 810A. New area 800A may then be modified to contain higher quality graphics or other parameters. The invention then repeats, in that if it is determined that the gaze point remains within new sub-area 810A, area 800A remains constant, however if the gaze point is detected outside of new sub-area 810A, area 800A is redefined.

In these or other embodiments, filtering of gaze information may performed to ensure that relocation of area 800 is necessary. For example, the system may determine a gaze point 210 is located outside the sub-area 810 however it may perform no action (such as relocating the area 800) until a predetermined number of gaze points 210 are located outside the sub-area (for example 2, 5, 10, 50). Alternatively, the system could temporarily enlarge area 800 until it is certain the gaze point 210 is located within a certain area. Additionally, predefined time periods may be established to determine if gaze points 210 have moved outside of sub-area 810 for at least those time periods prior to enlarging or changing are 800.

Figure 8:
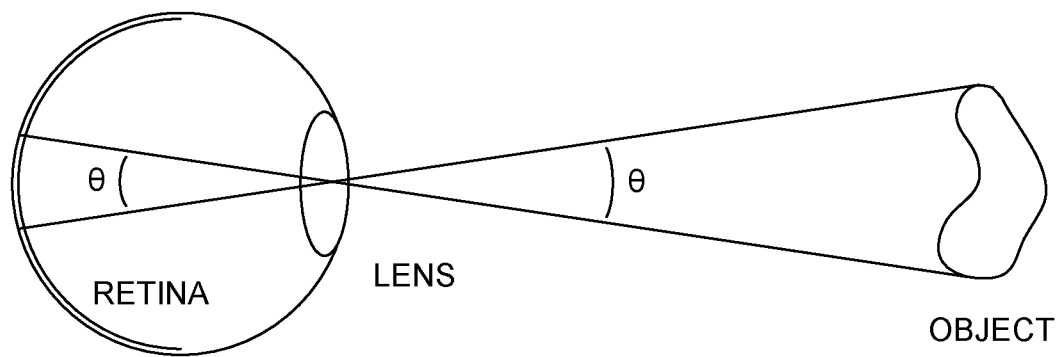
FIG. 8 is a diagram demonstrating an eccentricity angle.

In some embodiments, the size of area 810 may be based on an eccentricity angle of about 1-5 degrees from the currently determined gaze point. In exemplary embodiments, the angle may be about 3 degrees. Although the concept of an eccentricity angle would be well understood by a person of skill in the art, for demonstration purposes, its use in the present embodiment will now be described with reference to FIG. 8.

The eccentricity angle θ represents a person's fovea vision. In some embodiments, it may be preferable that area 800 is larger than the area labeled "object" in FIG. 8. This means that there may be a high probability that while a person's gaze point 210 remains within the sub-area 810, that person will not be able to perceive information outside the area 800 at high quality. The size of the area labeled "object" on display device 110 is primarily dependent on the physical size of display device 110 and the distance between the eye(s) and display device 110.

The size of area 800 may be modified to affect performance, as the greater the size of area 800, the more system resources are required to render graphics at higher quality. By way of example, the area 800 may be of such size so as to fit within the display 2 to 12 times. This size may be optionally linked directly to the size of display device 110, or to the eccentricity angle, such that the size may scale efficiently. In a further embodiment, gaze point 210 may be determined after adjusting information obtained by eye tracking device 120 to remove noise. Different individuals may have different levels of noise in the gaze information obtained by eye tracking device 120 (for example, due to wandering of their eye(s) about the gaze point). If an individual has a low level of noise, area 800 may be smaller, and thus performance of the system on which the present embodiment is being practiced may be increased.

In another embodiment of the invention, a non-transitory computer readable medium having instructions thereon for presenting graphics on display device 110 is provided. The instructions may be executable by one or more processors to at least display an image on display device 110. The instructions may also be executable to receive information from eye tracking device 120 indicative of at least one of a gaze point of a user on display device 110, or a change in the gaze point of the user on display device 110. The instructions may further be executable to cause graphics processing device 130 to modify the image displayed on display device 110 based at least in part on the gaze point of the user on display device 110, or the change in the gaze point of the user on display device 110. Thus, a non-transitory computer readable medium able to implement any of the features described herein in relation to other embodiments is also provided.

Figure 5:
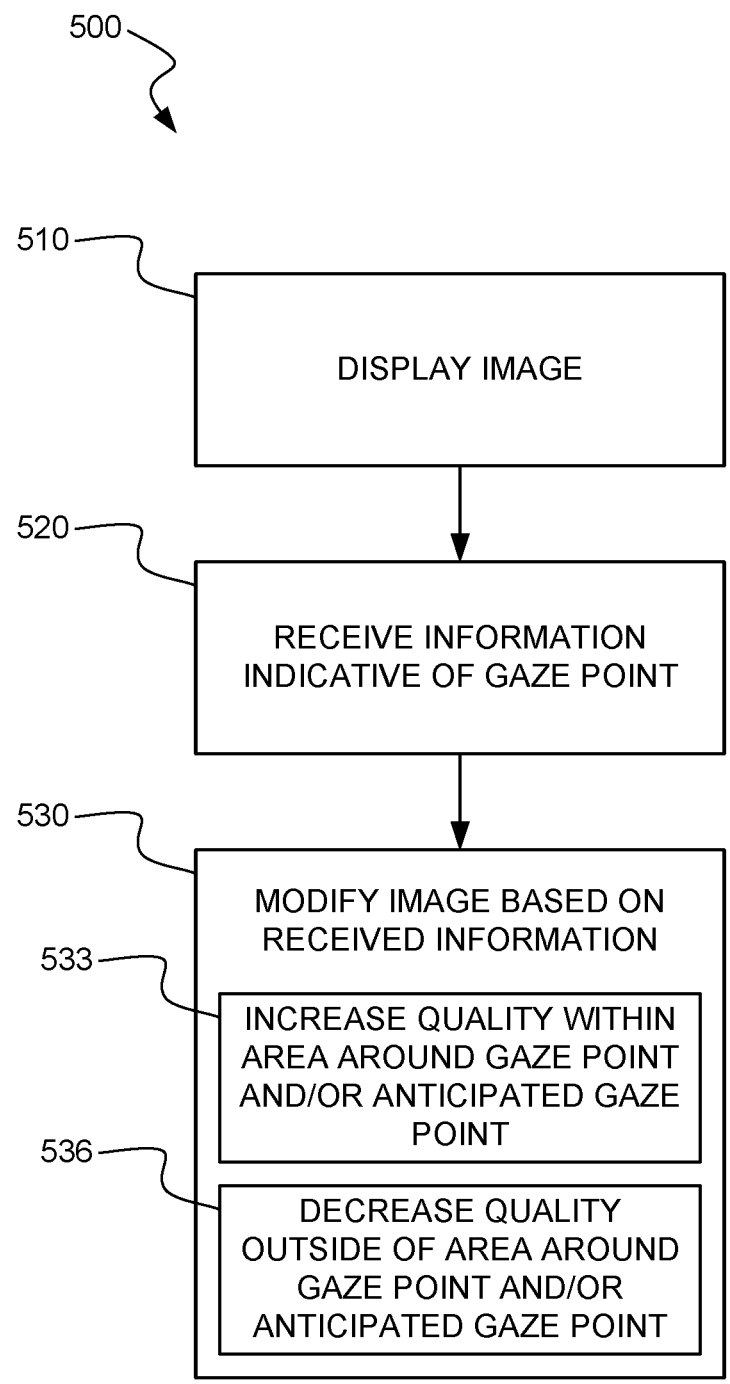
FIG. 5 is flow diagram of one possible method of the invention for modifying an image based on a user's gaze point.

In another embodiment of the invention, a method 500 for presenting graphics on display device 110 is provided as shown in FIG. 5. At step 510, method 500 may include displaying an image on display device 110. At step 520, method 500 may also include receiving information from eye tracking device 120 indicative of at least one of a gaze point of a user on display device 110, or a change in the gaze point of the user on display device 110. At step 530, method 500 may further include causing graphics processing device 130 to modify the image displayed on display device 110 based at least in part on the gaze point of the user on display device 110, or the change in the gaze point of the user on display device 110. Step 530 may include, at step 533, increasing the quality of the image in an area around the gaze point of the user, relative to outside the area. Step 530 may also include, at step 536, decreasing the quality of the image outside an area around the gaze point of the user, relative to inside the area. Thus, a method to implement any of the features described herein in relation to other embodiments is also provided.

In some embodiments, the systems and methods described herein may be toggled on and off by a user, possibly to account for multiple additional viewers of display device 110 being present. In other embodiments, the systems and methods described herein may automatically toggle on when only one user is viewing display device 110 (as detected by eye tracking device 120), and off when more than one user is viewing display device 110 (as detected by eye tracking device 120). Additionally, in some embodiments, the systems and methods described herein may allow for reduction in rendering quality of an entire display device 110 when no viewers are detected, thereby saving system resources and power consumption when display device 110 is not the primary focus of any viewer.

In other embodiments, the systems and methods described herein may allow for modifying multiple portions of an image on display device 110 to account for multiple viewers as detected by eye tracking device 120. For example, if two different users are focused on different portions of display device 110, the two different areas of the image focused on may be rendered in higher quality to provide enhanced viewing for each viewer.

In yet other embodiments, data associated with an image may inform the systems and methods described herein to allow prediction of which areas of an image may likely be focused on next by the user. This data may supplement data provided by eye tracking device 120 to allow for quicker and more fluid adjustment of the quality of the image in areas likely to be focused on by a user. For example, during viewing of a sporting event, a picture-in-picture of an interview with a coach or player may be presented in a corner of the image. Metadata associated with the image feed may inform the systems and methods described herein of the likely importance, and hence viewer interest and likely focus, in the sub-portion of the image.

Figure 6:
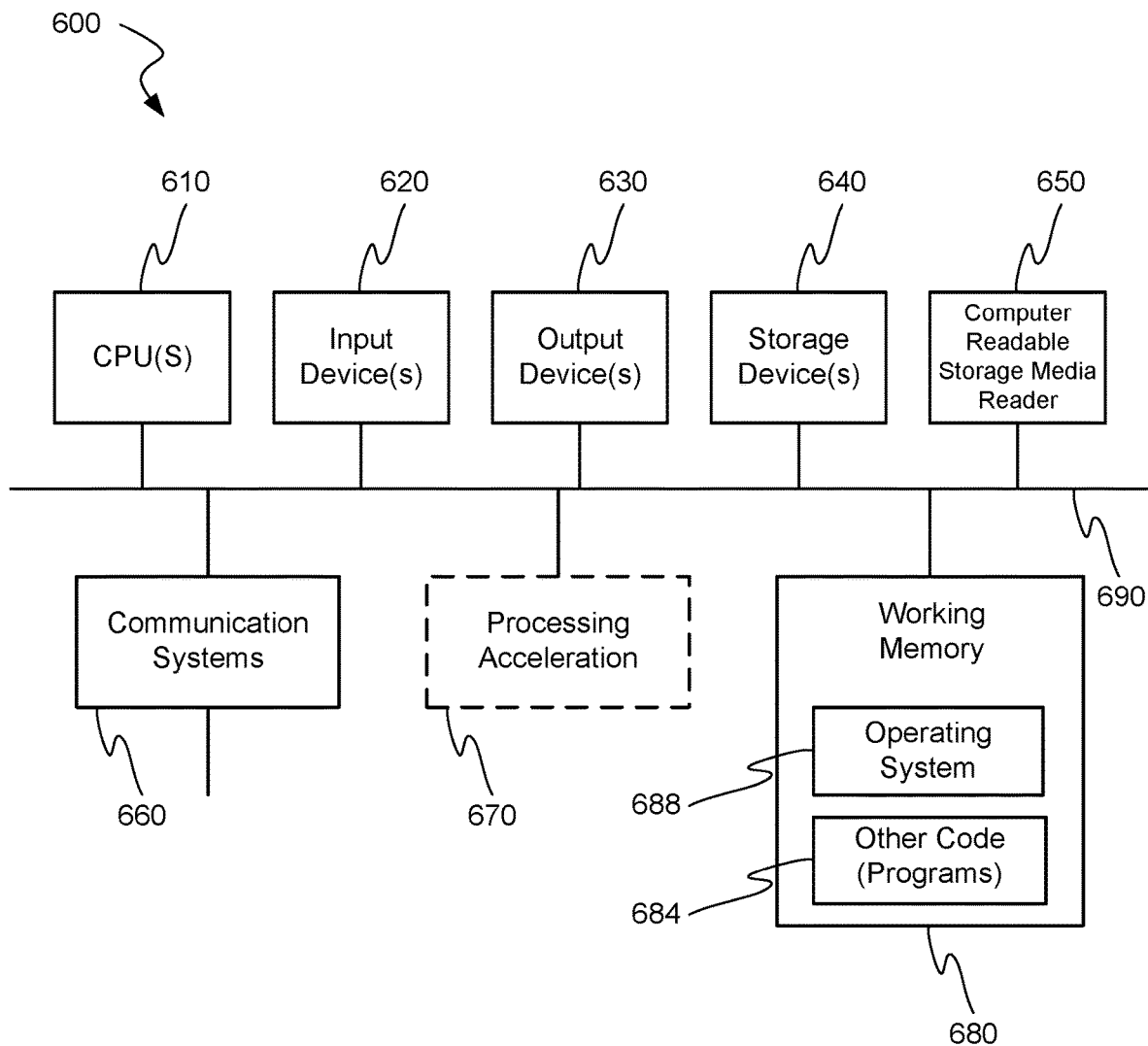
FIG. 6 is a block diagram of an exemplary computer system capable of being used in at least some portion of the devices or systems of the present invention, or implementing at least some portion of the methods of the present invention.

FIG. 6 is a block diagram illustrating an exemplary computer system 600 in which embodiments of the present invention may be implemented. This example illustrates a computer system 600 such as may be used, in whole, in part, or with various modifications, to provide the functions of eye tracking device 120, graphics processing device 130, the game console, the processor/computer 140, and/or other components of the invention such as those discussed above. For example, various functions of eye tracking device 120 and associated processors may be controlled by the computer system 600, including, merely by way of example, tracking a user's gaze point, determining an anticipated gaze point, controlling graphics processing device 130, etc.

The computer system 600 is shown comprising hardware elements that may be electrically coupled via a bus 690. The hardware elements may include one or more central processing units 610, one or more input devices 620 (e.g., a mouse, a keyboard, etc.), and one or more output devices 630 (e.g., a display device, a printer, etc.). The computer system 600 may also include one or more storage device 640. By way of example, storage device(s) 640 may be disk drives, optical storage devices, solid-state storage device such as a random access memory ("RAM") and/or a read-only memory ("ROM"), which can be programmable, flash-updateable and/or the like.

The computer system 600 may additionally include a computer-readable storage media reader 650, a communications system 660 (e.g., a modem, a network card (wireless or wired), an infra-red communication device, Bluetooth™ device, cellular communication device, etc.), and working memory 680, which may include RAM and ROM devices as described above. In some embodiments, the computer system 600 may also include a processing acceleration unit 670, which can include a digital signal processor, a special-purpose processor and/or the like.

The computer-readable storage media reader 650 can further be connected to a computer-readable storage medium, together (and, optionally, in combination with storage device(s) 640) comprehensively representing remote, local, fixed, and/or removable storage devices plus storage media for temporarily and/or more permanently containing computer-readable information. The communications system 660 may permit data to be exchanged with a network, system, computer and/or other component described above.

The computer system 600 may also comprise software elements, shown as being currently located within a working memory 680, including an operating system 684 and/or other code 688. It should be appreciated that alternate embodiments of a computer system 600 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer system 600 may include code 688 for implementing any or all of the function of the various elements of the architecture as described herein. For example, software, stored on and/or executed by a computer system such as system 600, can provide the functions of eye tracking device 120, graphics processing device 130, the game console, the processor/computer, and/or other components of the invention such as those discussed above. Methods implementable by software on some of these components have been discussed above in more detail.

The invention has now been described in detail for the purposes of clarity and understanding. However, it will be appreciated that certain changes and modifications may be practiced within the scope of the appended claims.

In some embodiments, the size and/or the shape of the area around the gaze position may be changed based on the location of the gaze position with respect to the edge of the field-of-view. The field-of-view of the VR headset is limited by the lens design, meaning, the image viewed by the VR user is limited to a specific size of display region, namely field-of-view. Therefore, the edge of the field-of-view may also refer to the lens edge. Most VR headsets nowadays suffer low visibility issue in the vicinity of the edge of the field-of-view. This may occur due to the lens quality (e.g. lens distortion), misalignment between the display device and the lens. In that case, the conventional foveated rendering method is less effective than was previously believed. The conventional foveated rendering method always rendering high quality image in the foveated region, in which the gaze position is substantially in the center of the foveated region even when the gaze position is closed to the edge of the field-of-view. However, due to the aforementioned flaw of the optic design of the VR headset, the user cannot see the high-quality image anyway whenever the gaze position in closed to the edge of the field-of-view. Therefore, there is a need in foveated rendering application that dynamically controlling the foveated rendering region in response to the gaze position close to or within the edge of the field-of-view. In the interest of brevity, the foveated rendering region corresponding to a gaze position close to or within the edge of the field of view is referred to herein as an "edge foveated region." By adjusting the edge foveated region (e.g., reducing its size relative to the one of a non-edge foveated region), the processing to display content in this region is optimized (e.g., the amount of content that should be processed and rendered is reduced, thereby saving power consumption, processing, and memory which are important for the proper operations of a VR headset).

In a non-limiting example, the VR headset represents a wearable computing device that can be worn by a user. This wearable computing device may include at least one display device and one or lens placed in front the display device and the lens is placed at the side of the user's eyes when the computing device is being worn by the user. The fixation position is determined by an eye tracking device. The fixation position indicates a gaze position of at least one of the user's eyes, is maintained in a single position with respect to the field-of-view over a period of time. Moreover, the fixation position may also indicate the one of the gaze positions during the smooth pursuit. A processing device processes data about the gaze fixation positions and set foveated regions relative to these positions. A graphics processing device presents the images, the fixation positions on the images, and the foveated regions. The wearable computing device may include the eye tracking device, the processing device, and the graphics processing device.

FIGS. 9a and 9b illustrates an example of components of a VR headset, according to an embodiment. A user of the VR headset positions his or her eye 910 to view a display device 930 of the VR headset through a lens 920 of the VR headset.

The lens 920 can be thought as including a central region 922 and an edge region 924 around the central region 922. The sizes of the central and edge regions 922 and 924 and their relative locations depend on the type and properties of the lens 920. Given the lens 920 and display device 930 configuration (e.g., relative positions and distances between the two and the size of each), the central region 922 and edge region 944 can be mapped to the graphical user interface (GUI) 932 of the display device 930 (e.g., the area of the screen where content is presented to the user). As illustrated, the regions are mapped to a set of horizontal lines 934 and vertical lines 936 (shown as dotted lines in FIG. 9). The lines 934 and 936 form a rectangle at the center of the GUI 932. The interior of the rectangle corresponds to the central region 922 of the lens 920 and the area outside the rectangle approximately corresponds to the area of edge region 924. This portion of the GUI 932 is referred to herein as a central area. Remaining portions of the GUI 932 outside the rectangle correspond to the edge region 924 of the lens 920. These remaining portions of the GUI 932 are referred to herein as an edge area.

The central area and edge area can be defined in various ways. In an example, the horizontal lines 934 and 936 correspond to the boundary between the central region 922 and the edge region 924 of the lens 920. These lines can be defined as pixel thresholds or pixel values from the boundaries of the GUI 932. For instance, the bottom left corner of the GUI 932 is set as a center of an (X, Y) coordinate system. The horizontal lines 934 are defined as (X=first offset in pixels, Y=0) and (X=second offset in pixel, Y=0). Similarly, the vertical lines 936 are defined as (X=0, Y=third offset in pixels) and (X=0, Y=fourth offset in pixels). Hence, the central area can be defined as (first offset in pixels<X<second offset in pixels, third offset in pixels<Y<fourth offset in pixels). The edge area can be defined as the GUI 932 minus the central region. These definitions can be stored in memory of the VR headset and accessible therefrom to support the rendering of the foveated region on the GUI 932.

When the user gazes through the central region 922 of the lens 920, his or fixation position 912 is within the central area of the GUI 932. In this case, a foveated region 950 can be determined and used to present content on the GUI 932 (e.g., content at a pixel resolution within the first foveated region, and content at a lower pixel resolution outside the foveated region). The first foveated region has a first shape, a first size, and a first position relative to the fixation position 912, where the shape, size, and position are defined according to first foveated region settings (referred to hereinafter as settings). For example, the first settings are for a circular shape centered around the fixation position 912. Generally, a setting defines at least one of a size, a shape, or positioning of a foveated region relative to a fixation position.

When the user gazes through the edge region 924 of the lens 920, his or fixation position 914 is within the edge area of the GUI 932. In this case, a foveated region 960 can be determined and used to present the content on the GUI 932 and has a second shape, a second size, and a second position relative to the fixation position 914, where this shape and size are defined according to second settings. The second settings changes at least one of the first shape, the first size, or the first position. For example, the second settings are for an elliptical shape centered around the fixation position 914, that contains the fixation position 914 (e.g., not necessarily as its center), or that is in proximity of but does not contain the fixation position 914. The settings also specify that the closer the fixation position 914 is to the boundary of the GUI 932, the smaller the size of the ellipse becomes.

Hence, when the fixation position of the user is detected to be within the central area, the foveated region is defined according to the first settings. When the fixation position is detected to be outside the central area (e.g., inside the edge area), the foveated region is defined according to the second settings and, thus, changes. The changes may not be limited to how the foveated region is presented but also to the amount of content displayed on the GUI 932 is processed and rendered. In particular, by reducing the size of the foveated region in the edge area relative to its size in the central area, the amount of high resolution content is decreased and the amount of low resolution content is increased, thereby optimizing the processing of the content.

Changes to the foveated region are further described in connection with the next figures. In the figures, the field-of-view and its edge are used to illustrate the changes. Generally, the field-of-view corresponds to the central region 922 of the lens 920 and the central area of the GUI 932. In other words, if the user gazes through the central region 922 and his or her fixation position is within the central area, the user's gaze is considered to be within the field-of-view. Conversely, if the user gazes through the edge region 924 and his or her fixation position is within the edge area, the user's gaze is considered to be within the edge of field-of-view. In other words, if the user's gaze is within the field-of-view, his or her fixation position is within the central area of the GUI 932. If the user's gaze is within the edge of the field-of-view, his or her fixation position is within the edge area of the GUI 932.

In an example, the lens 920 is a Fresnel lens. A center region of this Fresnel lens is clear of any Fresnel steps. Outside of the center region, the Fresnel steps may surround the center region in an annular manner and have varying groove depth and step size. In this example, the center region of the Fresnel lens is contained in the central region 922. The central region 922 may also but need not include any of the Fresnel steps. Conversely, the edge region 924 may include some or all of these Fresnel steps.

Although FIG. 9 illustrates that the lens 920 has one central region 922 and one edge region 924, other number of regions is possible. For example and in addition to these two regions 922 and 924, the lens 920 may include additional edge regions in a concentric configuration. Referring back to the Fresnel lens, the Fresnel lens' center region amounts to the central region 922. Each Fresnel step (or the region of the Fresnel lens between two steps) amount to an edge region. Of course, when multiple central regions and/or edge regions are defined, these regions can be mapped to corresponding areas of the GUI 932 and the definition of these areas (e.g., using the (X, Y) coordinate system and offsets in pixels) can be stored in memory of the VR headset.

Figure 10A:
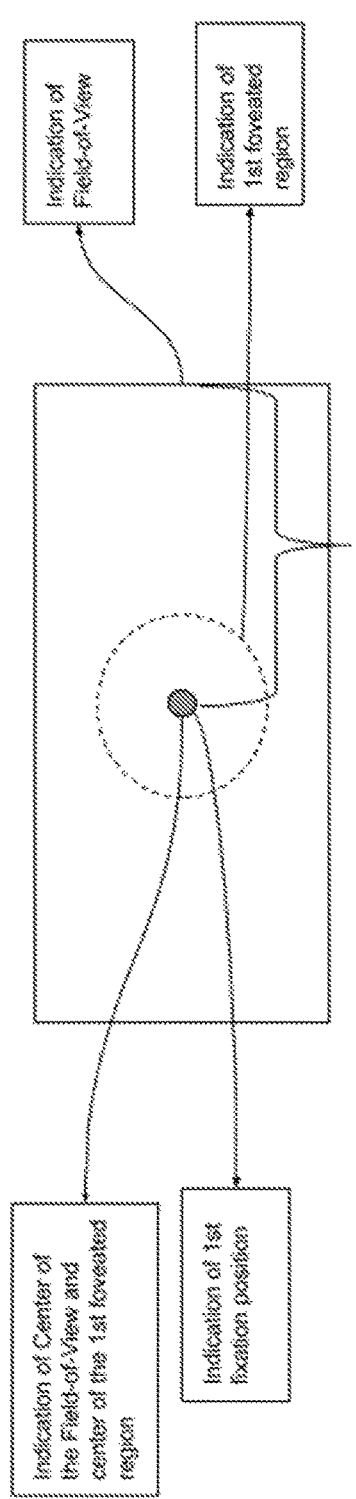
FIGS. 10A-10C is an illustration of continuous adjustable foveated region based on the relative distance between the fixation position and the edge of the display image, according to an embodiment.
Figure 10B:
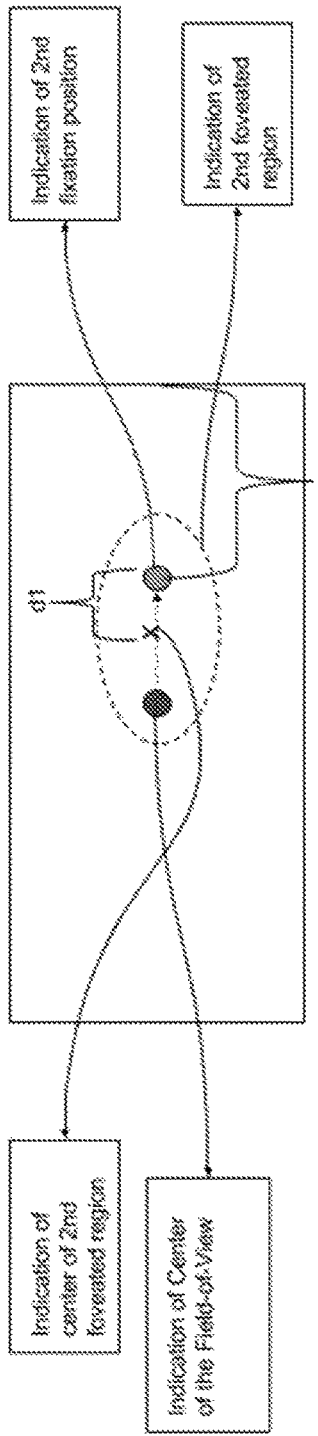
Figure 10C:
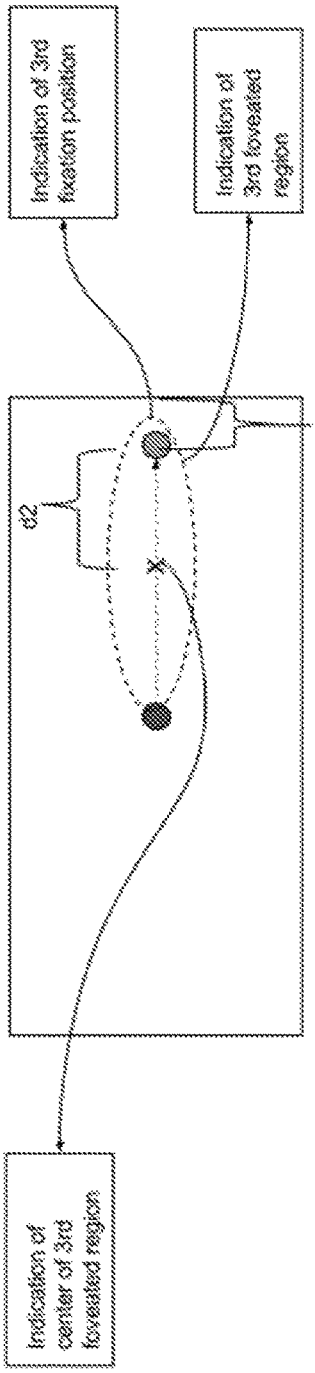

In some embodiments, the size and/shape of the foveated region is continuously changed in response to the change of the fixation position with relative to the edge of the field-of-view. The closer the fixation position is to the edge of the field-of-view, the longer distance is between the center of the foveated region and the fixation position. For example, as illustrated in FIGS. 10A, 10B, and 10C, a display image is displayed on the display device and shows the user's fixation position (e.g., with a dot or some other geometric shape). As illustrated in these figures, the fixation position moves from the center of the field-of-view towards the edge of the field-of-view (e.g., from gazing at the center of the display image through the center of the lens 920 to gazing at the edge of the display image through the edge region 924 of the lens 920). In an example, as illustrated in FIG. 10A, in the first phase, when the fixation position (first fixation position hereinafter) is in the center of the field-of-view, the distance between the first fixation position and the edge of the field-of-view is determined as D1 (D1 corresponds to the distance between the first fixation position on the display image and an edge (e.g., the vertical right edge) of the display image or GUI 932). And a first foveated region is determined based on D1, in which the fixation position is in the center of the first foveated region. And the distance between the first fixation position and the edge of the field-of-view is determined as D1. The size and shape of the foveated region may be set up based on the user's preference (and stored in the settings described herein above). In the second phase (following the first phase), as illustrated in the FIG. 10B, the fixation position is moved to a second fixation position. And the distance between the second fixation position and the edge of the field-of-view is determined as D2 (D2 corresponds to the distance between the second fixation position on the display image and the edge (e.g., the vertical right edge) of the display image or GUI 932). A second foveated region is determined based on the determined D2. The distance between the center of the second foveated region and the second fixation position is determined as d1. And the distance between the second fixation position and the edge of the field-of-view is determined as D2. In the third phase (following the second phase), as illustrated in the FIG. 10C, the fixation position is moved to a third fixation position. And the distance between the third fixation position and the edge of the field-of-view is determined as D3 (D3 corresponds to the distance between the third fixation position on the display image and the edge (e.g., the vertical right edge) of the display image or GUI 932). And the third foveated region is determined based on D3. The distance between the center of the third foveated region and the third fixation position is determined as d2. Moreover, the value of d2 is larger than the value of d1. Regarding the relationship of the value of D1, D2 and D3, it is D1>D2>D3. Accordingly, shape and size of the foveated region changes based on these distances (from a circular shape to a more elliptical shape) and the positioning of the foveated region relative to the fixation position changes (e.g., from being centered on the fixation position to having the fixation position close to its edge). In this example illustration, no matter how close the fixation is relative to the edge of the field-of-view, the fixation position is included in the foveated region in the illustrative example of FIGS. 10A, 10B, and 10C.

In another embodiment, the foveated region may not be continuously changed in response to the change of the fixation position. The size and shape of the foveated region may only start changing once the distance between the fixation position and the edge of the field-of-view is smaller than a threshold value (e.g., once the fixation position crosses one of the horizontal or vertical lines 934 or 936, where the threshold value can be set as a function of the first, second, third, and/or fourth offsets described herein above). The low visibility issue may typically occur when the user's fixation point is close to the edge of field-of-view (e.g., when the distance is smaller than the threshold value). In most situation, if the user's fixation positions substantially stay in a central region of the field-of-view, there may be no need to adjust the foveated region. In a VR headset, a Fresnel lens is typically used. A center region of this lens is clear of any Fresnel steps. And outside of the center region, the Fresnel steps may surround the center region in an annular manner and have varying groove depth and step size. Because the user's field-of-view is limited by the lens, if the fixation position is within the center region of the lens (e.g., the central region 922), meaning if the fixation position is within the center region of the field-of-view, the user may always get good visibility. In such situation, the foveated region may not be changed no matter how the fixation position is changed within the center region of the field-of-view. However, if the fixation position leaves the central region of the lens (e.g., moves to the edge region 924), meaning the fixation position in the region containing Fresnel steps, the user's visibility may get affected. In such case, we may use aforementioned method to adjust the size and/or shape of the foveated region in response to the change of the fixation position outside of the center region of the field-of-view.

In some embodiments, the size of the foveated region is continuously changed as the fixation position moves closer to the edge of the field-of-view. More specifically, the size of the foveated region may get smaller and smaller as the distance between the fixation position and the edge of the field-of-view gets shorter and shorter (e.g., once the fixation position crosses one of the horizontal or vertical lines 934 or 936 and the distance between the fixation position to the edge of the display image or the edge of the GUI 932 shrinks or, equivalently, the distance between the fixation point and the crossed line grows). As illustrated in FIGS. 11A, 11B, and 11C, a display image is displayed on the display device and indicates the fixation position. A first fixation position is determined in FIG. 11A, and the distance between the first fixation position and the edge of the field-of-view is determined as D3 (D3 corresponds to the distance between the first fixation position on the display image and the edge (e.g., the vertical right edge) of the display image or GUI 932). And accordingly, the first foveated region is determined based on D3. Then the fixation position is moved to the second position as shown in FIG. 11B. The distance between the second fixation position and the edge of the field-of-view is determined as D4 (D4 corresponds to the distance between the second fixation position on the display image and the edge (e.g., the vertical right edge) of the display image or GUI 932). And then the second foveated region is determined based on D4 (e.g., because D4 is smaller than D3, the size of the foveated region decreases while this region remains centered on the second fixation position). Then the fixation is moved from the second position to the third position as shown in FIG. 11C. The distance between the third fixation position and the edge of the field-of-view is determined as D5 (D5 corresponds to the distance between the third fixation position on the display image and the edge (e.g., the vertical right edge) of the display image or GUI 932). And then the third foveated region is determined based on D5 (e.g., because D5 is smaller than D4, the size of the foveated region decreases even more while this region remains centered on the third fixation position). As illustrated in the example, the foveated region gets smaller and smaller as the fixation moves towards the edge of the field-of-view. The decrease to the size could be set as a function of the distance between a fixation position and the edge of the field-of-view (e.g., the distance between the fixation position on the display image and the edge (e.g., the vertical right edge) of the display image or GUI 932). For example, an inverse function is used. Alternatively, the shape of the foveated region is not limited to circular shape but can be any shape.

Figure 12A:
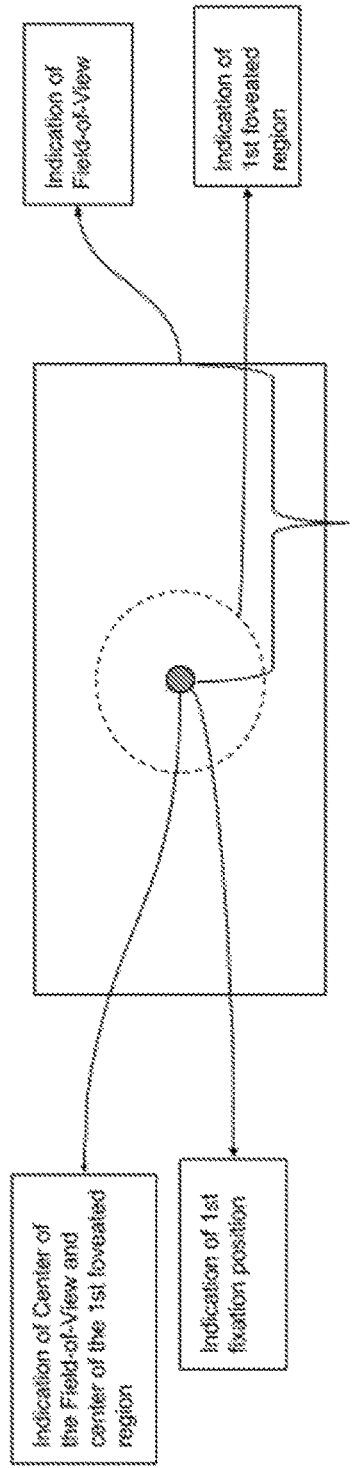
FIGS. 12A-12C is another illustration of continuous adjustable foveated region based on the relative distance between the fixation position and the edge of the display image, according to an embodiment.
Figure 12B:
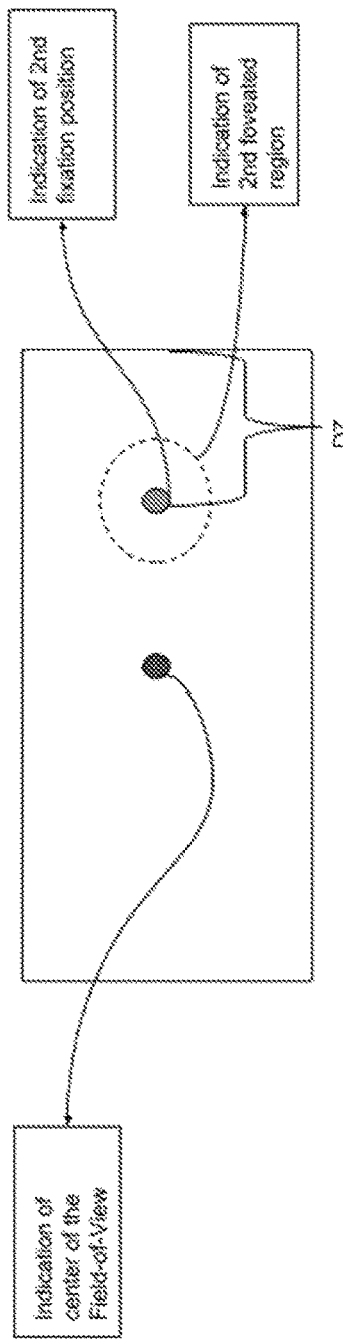
Figure 12C:
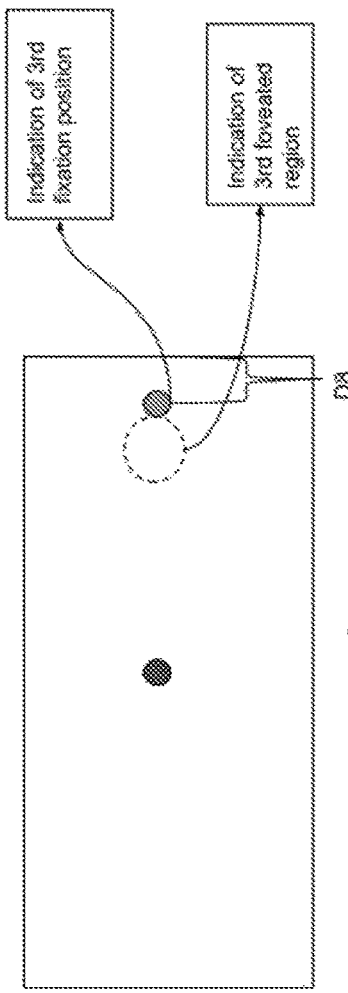

In some embodiments, a foveated region is determined based on the fixation position and the fixation position may not be included in the foveated region if the distance between the fixation position and the edge of the field-ofview matches a predetermined condition. And the predetermined condition is for the value of the distance to be smaller than a threshold value (e.g., once the fixation position is close the edge of the display image or the GUI 932 by a certain predefined pixel distance such as twenty pixels). In an event, the fixation position is substantially close to the edge of the field-of-view, no matter how high the image quality is rendered in the foveated region, the user may not notice the high-quality image because of at least the limitation of optic design. In FIG. 12A, a first fixation position is determined and the distance between the first fixation position and the edge of the field-of-view is determined as D6 (D6 corresponds to the distance between the first fixation position on the display image and the edge (e.g., the vertical right edge) of the display image or GUI 932). The system may compare D6 with a first threshold value and output the result that D6 is larger than the threshold value (e.g., this value is defined based on the offsets corresponding to the horizontal and vertical lines 934 and 936). And accordingly, a first foveated region is determined based on D6 and the first fixation position is included in the first foveated region. In FIG. 12B, a second fixation position is determined and the distance between the second fixation position and the edge of the field-of-view is determined as D7 (D7 corresponds to the distance between the second fixation position on the display image and the edge (e.g., the vertical right edge) of the display image or GUI 932). The system may compare D7 with the first threshold value and a second threshold value (e.g., this second value corresponds to the predefined pixel distance to the edge and is smaller than the first threshold value) and output the result that D7 is smaller than the first threshold value and larger than the second threshold value. And accordingly, a second foveated region is determined based on D7 and the second fixation position is still included in the second foveated region. And the size of the second foveated region may be changed comparing to the first foveated region. As illustrated in the FIGS. 12A and 12B, the second foveated region is smaller than the first foveated region. The first and second fixation position may be in the center of the first and second foveated region respectively. In FIG. 12C, a third fixation position is determined and the distance between the third fixation position and the edge of field-of-view is determined as D8 (D8 corresponds to the distance between the third fixation position on the display image and the edge (e.g., the vertical right edge) of the display image or GUI 932). The system may compare D8 with the threshold values and output the result that D8 is smaller than the second threshold value. And accordingly, a third foveated region is determined based on D8 (e.g., this region is made smaller and the third fixation position is not included in the third foveated region). Although two threshold values are described, a different number of threshold values can be used. For example, the first threshold value may not be used at all. Instead, the size of foveated region can be proportionally reduced between D6 and D7 until the distance becomes smaller than the second threshold value (at that point, the size foveated region can be further reduced, the shape changed, and the fixation point no longer contained).

Figure 13:
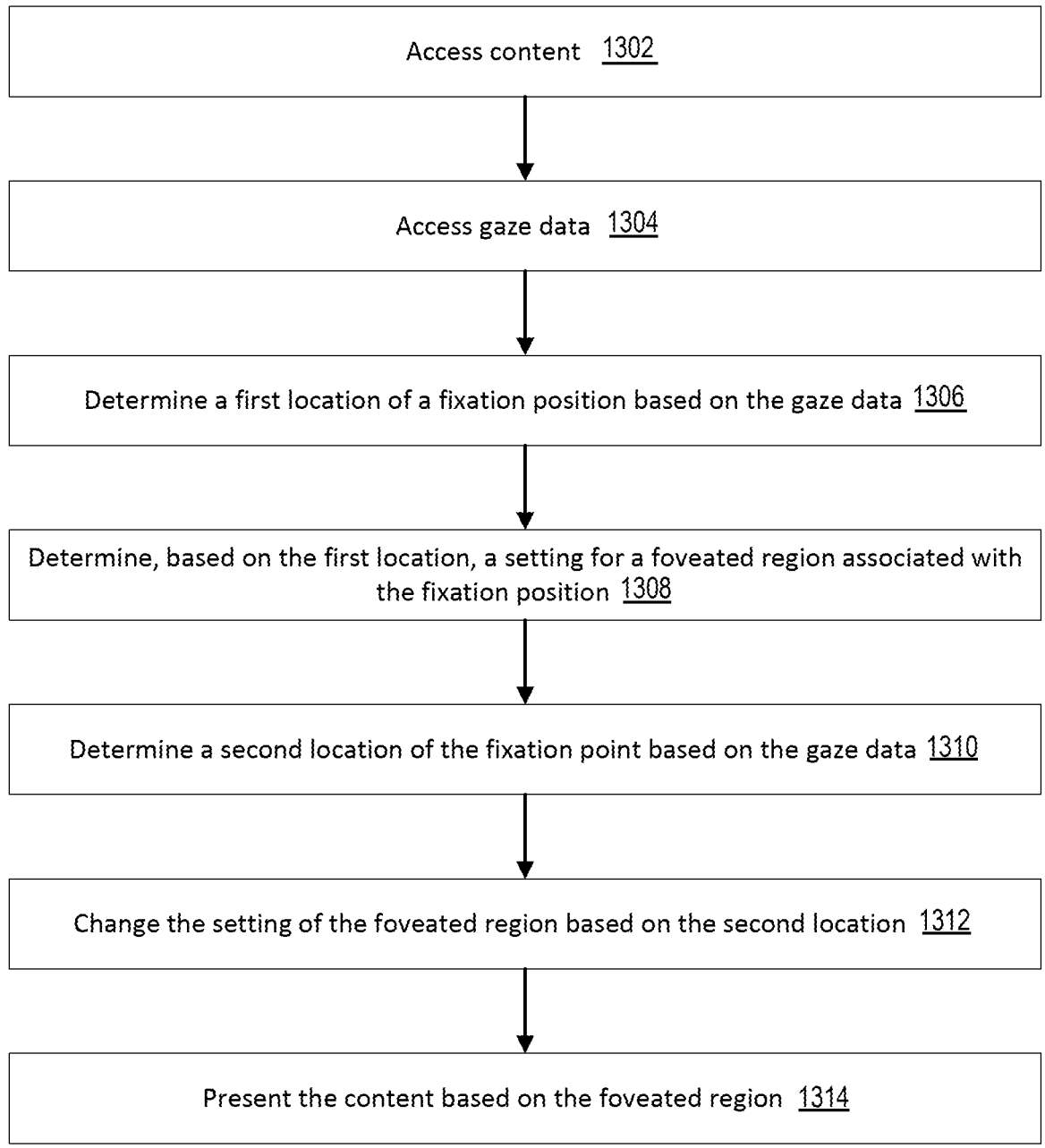
FIG. 13 illustrates an example flow for updating a foveated region, according to an embodiment.

FIG. 13 illustrates an example flow for updating a foveated region, in accordance with an embodiment. A computing device is described as performing the operations of the example flow. In an example, computing device is a wearable computing device, such as a virtual reality (VR) headset or an augmented reality (AR) headset, that implements eye tracking. In this example, the wearable computing device includes a display device configured to present a graphical user interface, a graphics processing device configured to present an indication of a fixation position of a user gaze on the graphical user interface and content in the graphical user interface (where the content is presented based on a foveated region associated with the fixation position), an eye tracking device configured to generate gaze data indicating the fixation position, and a processing device configured to determine and change settings of the foveated region based on changes to the fixation position (e.g., changes relative to locations on the graphical user interface or relative to a field-of-view through a lens).

Instructions for performing the operations of the illustrative flow can be stored as computer-readable instructions on a non-transitory computer-readable medium of the computing device As stored, the instructions represent programmable modules that include code or data executable by a processor(s) of the computing device (e.g., by the processing device of the wearable computing device). The execution of such instructions configures the computing device to perform the specific operations shown in the figure and described herein. Each programmable module in combination with the processor represents a means for performing a respective operation(s). While the operations are illustrated in a particular order, it should be understood that no particular order is necessary and that one or more operations may be omitted, skipped, and/or reordered.

The example flow starts at operation 1302, where the computing device access content. For example, the content is available from memory of the computing device, is accessed therefrom, and may be buffered for presentation on the graphical user interface.

At operation 1304, the computing device accesses gaze data. For example, the gaze data is generated by the eye tracking device and indicates the fixation position. Generally, the gaze data corresponds to a gaze of a user of the computing device, where his or her gaze is through a lens (e.g., a Fresnel lens) of the computing device and is on the graphical user interface.

At operation 1306, the computing device determines a first location of the fixation position on the graphical user interface based on the gaze data. For example, the gaze data indicates the (X, Y) coordinates of the fixation position on the graphical user interface. Depending on their values, the coordinates fall into a central area or an edge area of the graphical user interface or, similarly, into a central region or an edge region of the lens.

At operation 1308, the computing device determines a setting for the foveated region associated with the fixation position. The setting is determined based on the first location and defines at least one of a size, a shape, or positioning of the foveated region relative to the fixation position. For example, various settings defining the shape, size, and relative positioning of the foveated region can be stored in memory of the computing device. These settings generally depend on the locations of the fixation points. For instance, the computing device determines that the first location is within the central area of the graphical user interface (e.g., by comparing the values of the (X, Y) coordinates to the boundary lines that define this area), or equivalently, corresponds to a field-of-view through the central region of the lens. The first setting corresponding to this type of location is accessed from the memory. In another illustration, the computing device computes a distance (e.g., the shortest distance) between the fixation position at the first location and an edge of the graphical user interface. If that distance is larger than a first threshold value, the first setting is used. In this illustration, the first threshold value is a distance difference between a boundary line of the central area and the edge of the graphical user interface (or, similarly, a distance difference between an outer boundary of the central region and an outer boundary of the edge region of the lens).

At operation 1310, the computing device determines a second location of the fixation position on the graphical user interface based on the gaze data. The second location is associated with a change to the user gaze. For example, the gaze data indicates that the user's gaze on the graphical user interface changed resulting in a change to the location of the fixation position. The fixation position may be maintained in single position for a period of time for a portion of the change to the user gaze (e.g., until the user changes his or her gaze point by certain amount). The gaze data includes the (X, Y) coordinates of the second location on the graphical user interface. Depending on their values, these (X, Y) coordinates fall into the central area or the edge area of the graphical user interface or, similarly, into the central region or the edge region of the lens.

At operation 1312, the computing device changes, based on the second location, the setting for the foveated region by modifying at least one of the size, the shape, or the positioning of the foveated region relative to the fixation position presents the content based on the foveated region. In an example, the setting is changed by accessing the second setting from the memory based on the second location and using the second setting instead of the first one.

Different approaches for changing the setting are possible. In one example approach, a smooth pursuit of the fixation position is implemented (as illustrated in FIGS. 11A-11C for the change to the setting between distances D3, D4, and D5). Under this approach, the size and/or the shape is continuously adjusted between the first location and the second location. For instance, if the second location is closer to the edge of the graphical user interface, the size of the shape is gradually decreased from the first location to the second location and/or the shape gradually changes from a circle to an ellipse between the two locations. In another example approach, the foveated region is changed in steps. Under this approach, once the location of the fixation position changes by a certain threshold amount (e.g., the distance difference between the first and second locations is greater than the threshold amount), the setting is changed and, otherwise, the setting stays the same. In a third example approach, a hybrid strategy is used. For instance, the hot pursuit approach is followed for fixation points falling in the central area of the graphical user interface and the step approach is followed once the boundary of this central area is crossed.

Furthermore, different types of analysis are possible to determine the change to the setting based on the second location. A first example analysis relies on a distance (e.g., the shortest distance) between the fixation point to the edge of the graphical user interface. A second example analysis relies on a distance difference between the first and second locations. The type of thresholds can vary depending on the type of analysis. Each of these analysis examples and the associated thresholds are further described herein next.

In the first example analysis, the computing device may have computed a first distance between the first location of the fixation point and the edge of the graphical user interface (this computation may be performed under operation 1306 or 1308). The setting is determined based on the first distance. Here, the computing device also computes a second distance between the second location of the fixation point and the edge of the graphical user interface. The setting is changed based on the second distance. For instance, the computing device determines that the second distance is smaller than a first threshold value (e.g., based on a comparison between this distance and the first threshold value). At least one of the shape or the size of the foveated region changes based on the distance being smaller than the first threshold value (e.g., the size shrinks and/or the shape changes from circular to elliptical. The computing device may also compare the second distance to a second threshold amount (e.g., to determine how close the fixation point is to the edge of the graphical user interface). The second threshold value is smaller than the first threshold value. If the computing devices determines that the second distance is smaller than the second threshold, the positioning of the foveated region relative to the fixation point is changed because the fixation point is close to the edge. The first threshold value can be defined based on a Fresnel step of the Fresnel lens (as applicable) and/or based on a field-of-view on the graphical user interface through the lens. For instance, this value is the distance difference between the boundary line of the central area and the edge of the graphical user interface (or, similarly, the distance difference between the outer boundary of the central region and the outer boundary of the edge region of the lens). In comparison, the second threshold distance is predefined based on a proximity to the edge of the graphical user interface or, similarly, to the outer boundary of the edge region of the lens (e.g., set to a certain number of pixels, such as twenty).

In the second example analysis, the computing device computes a distance difference between the first location and the second location of the fixation point. The setting of the foveated region is changed based on the distance difference. In an illustration, the computing device determines that the distance difference is larger than a first threshold value. The shape or the size of the foveated region changes based on the distance difference being larger than the threshold value. This first threshold value can be predefined. In a smooth pursuit approach, the first threshold value can be set to one pixel or some other number of pixel (e.g., such that anytime the location of the fixation point, the foveated region can be continuously changed). In a step approach, the first threshold value can be set to be greater than a dimeter or length of the foveated region along the movement direction of the fixation point (e.g., if the foveated region is a circle with a thirty pixel diameter, the first threshold value is set to thirty pixels). In an additional illustration, the computing device determines that the distance difference is larger than a second threshold value, where the second threshold value is larger than the first threshold value. The second threshold value is used to detect whether the fixation position is close to the edge of the graphical user interface. In this case, the positioning of the foveated region relative to the fixation point is changed because the fixation position is close. The second threshold value can be defined based on the first location and the edge of the graphical user interface, for example, as a percentage (e.g., ninety percent) of the offset between the first location and the edge. For instance, if the offset between the two is a certain number of pixels (e.g., one hundred pixels), the second threshold value is ninety pixels. In this case, if the distance difference between the first and second locations is larger than ninety pixels, that difference indicates that the fixation point moved close to the edge of the graphical user interface.

At operation 1314, the computing device changes presents the content (e.g., an image) on the graphical user interface based on the foveated region that is defined according to the setting. The computing device may also present the fixation position as an overlay over the content. To optimize the presentation (e.g., by reducing the underlying processing), the computing device determines a portion of the content that has a location inside the foveated region and the remaining portion of the content that has a location outside the foveated region. To do so, the computing device compares for example the (X, Y) coordinates of the content portions to the (X, Y) coordinates of the foveated region. The portion and the remaining portion of the content are presented with an indication of one or more improvements of the portion relative to the remaining portion. For example, the portion is presented at a first pixel resolution, the remaining portion is presented at a second pixel resolution lower than the first pixel resolution. Other types of indication are possible. For instance, the indication is selected from a group consisting of an increased resolution, an increased content shading quality, an increased texture mapping quality, an increased quality of reflection rendering, an increased anti-aliasing, an increased frame rate, an increased three-dimensional rendering quality, an increased animation quality, an increased post-processing effects quality, an increased refraction quality, and an increased three-dimensional object quality (where "increased" refers to the portion having an increased value relative to the remaining portion).

What is claimed is:

1. A wearable computing device, comprising:
a display device configured to present a graphical user interface;
a graphics processing device configured to present an indication of a fixation position of a user gaze on the graphical user interface and content in the graphical user interface, wherein the content is presented based on a foveated region associated with the fixation position;
an eye tracking device configured to generate gaze data indicating the fixation position; and
a processing device configured to:
determine a first location of the fixation position on the graphical user interface based on the gaze data;
determine a setting for the foveated region associated with the fixation position, wherein the setting is determined based on the first location and defines at least one of a size, a shape, or positioning of the foveated region relative to the fixation position;
determine a second location of the fixation position on the graphical user interface based on the gaze data, the second location associated with a change to the user gaze; and
change, based on the second location, the setting for the foveated region by modifying at least one of the size, the shape, or the positioning of the foveated region relative to the fixation position;
determine a distance difference between the first location and the second location of the fixation point, wherein the setting is changed based on the distance difference; and
determine that the distance difference is larger than a threshold value, wherein at least one of the shape or the size of the foveated region changes based on the distance difference being larger than the threshold value, wherein at least one of the size or the shape of the foveated region is continuously adjusted based on the fixation position being in smooth pursuit between the first location and the second location.

2. The wearable computing device of claim 1, wherein the processing device is further configured to:
determine a first distance between the first location of the fixation point and an edge of the graphical user interface, wherein the setting is determined based on the first distance; and
determine a second distance between the second location of the fixation point and the edge of the graphical user interface, wherein the setting is changed based on the second distance.

3. The wearable computing device of claim 1, wherein the processing device is further configured to:
determine a distance between the second location of the fixation point and an edge of the graphical user interface; and
determine that the distance is smaller than an edge distance threshold value, wherein at least one of the shape or the size of the foveated region changes based on the distance being smaller than the edge distance threshold value.

4. The wearable computing device of claim 3, wherein the processing device is further configured to:
determine that the distance between the second location of the fixation point and the edge of the graphical user interface is smaller than a second edge distance threshold value, wherein the second edge distance threshold value is smaller than the edge distance threshold value, and wherein the positioning of the foveated region relative to the fixation point changes based on the distance being smaller than the second edge distance threshold value.

5. The wearable computing device of claim 3, further comprising a Fresnel lens, and wherein the edge distance threshold value is defined based on a Fresnel step of the Fresnel lens.

6. The wearable computing device of claim 3, further comprising a lens, and wherein the edge distance threshold value is defined based on a field-of-view on the graphical user interface through the lens.

7. The wearable computing device of claim 1, wherein the processing device is further configured to:
determine that the distance difference is larger than a second edge distance threshold value, wherein the second edge distance threshold value is larger than the edge distance threshold value, and wherein the positioning of the foveated region relative to the fixation point changes based on the distance difference being larger than the second edge distance threshold value.

8. The wearable computing device of claim 1, wherein a portion of content having a location inside the foveated region is presented at a first pixel resolution, and wherein a second portion of content having as location outside of the foveated region is presented at a second pixel resolution lower than the first pixel resolution.

9. The wearable computing device of claim 1, wherein a portion of the content has a location inside the foveated region, wherein a remaining portion of the content the image has a location outside the foveated region, and wherein the portion of the content is presented with an indication of one or more improvements of the portion relative to the remaining portion.

10. The wearable computing device of claim 9, wherein the indication is selected from a group consisting of:
an increased resolution;
an increased content shading quality;
an increased texture mapping quality;
an increased quality of reflection rendering;
an increased anti-aliasing;
an increased frame rate;

an increased three-dimensional rendering quality;
an increased animation quality an increased post-processing effects quality;
an increased refraction quality; and
an increased three-dimensional object quality.

11. The wearable computing device of claim 1, wherein the fixation position indicates a gaze position and is maintained in a single position for a period of time.

\* \* \* \* \*